US008665671B2

(12) United States Patent
Muyzert et al.

(10) Patent No.: US 8,665,671 B2
(45) Date of Patent: Mar. 4, 2014

(54) SEISMIC SENSOR DEVICES

(75) Inventors: Everhard Johan Muyzert, Girton (GB); James Edward Martin, Cottenham (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 12/812,277

(22) PCT Filed: Jan. 8, 2009

(86) PCT No.: PCT/GB2009/000033
§ 371 (c)(1),
(2), (4) Date: Aug. 24, 2010

(87) PCT Pub. No.: WO2009/087377
PCT Pub. Date: Jul. 16, 2009

(65) Prior Publication Data
US 2010/0302909 A1    Dec. 2, 2010

(51) Int. Cl.
*G01V 1/18*          (2006.01)
(52) U.S. Cl.
CPC .................................... *G01V 1/18* (2013.01)
USPC .......................................................... 367/178
(58) Field of Classification Search
USPC .......................................................... 367/178
See application file for complete search history.

(56) References Cited

U.S. PATENT DOCUMENTS

| | | | |
|---|---|---|---|
| 3,662,327 A | 5/1972 | White | |
| 4,334,296 A | 6/1982 | Hall, Jr. | |
| 4,692,907 A * | 9/1987 | Jubinski | 367/20 |
| 4,789,971 A | 12/1988 | Powers et al. | |
| 5,126,980 A | 6/1992 | Sallas et al. | |
| 5,235,554 A * | 8/1993 | Barr et al. | 367/13 |
| 5,724,306 A * | 3/1998 | Barr | 367/15 |
| 5,774,417 A * | 6/1998 | Corrigan et al. | 367/24 |
| 6,314,371 B1 * | 11/2001 | Monk | 702/17 |
| 6,385,132 B1 * | 5/2002 | Sackett | 367/188 |
| 6,453,745 B1 * | 9/2002 | Jalkanen | 73/514.09 |
| 6,584,038 B2 * | 6/2003 | Meunier | 367/25 |
| 7,926,614 B2 * | 4/2011 | Tenghamn et al. | 181/121 |
| 2002/0159331 A1 * | 10/2002 | Meunier | 367/15 |

(Continued)

FOREIGN PATENT DOCUMENTS

DE    961216    4/1957
EP    0736781 A1   10/1996

(Continued)

OTHER PUBLICATIONS

Combined Search and Examination Report of British Application Serial No. 0800376.6 dated Apr. 29, 2008.

(Continued)

*Primary Examiner* — Isam Alsomiri
*Assistant Examiner* — James Hulka

(57) ABSTRACT

A sensor device (100) is adapted to be installed at a land-air interface. The sensor device (100) comprises a fluid-filled housing (101) and a sensor arrangement (102, 103) supported within the housing (101) and coupled directly to the fluid so as to detect movement thereof. A seismic sensor installation comprises a sensor device (100) installed at a land-air boundary, wherein the sensor device comprises a fluid-filled housing (101) and a sensor arrangement (102, 103) supported within the housing (101) and coupled directly to the fluid as to detect movement thereof.

26 Claims, 21 Drawing Sheets

(56) References Cited

U.S. PATENT DOCUMENTS

| | | | |
|---|---|---|---|
| 2005/0088916 A1* | 4/2005 | Zhu et al. | 367/134 |
| 2005/0090987 A1* | 4/2005 | Amundsen et al. | 702/14 |
| 2005/0194201 A1* | 9/2005 | Tenghamn et al. | 181/112 |
| 2009/0065289 A1* | 3/2009 | Tenghamn et al. | 181/112 |
| 2011/0080808 A1* | 4/2011 | Muyzert et al. | 367/43 |
| 2011/0082647 A1* | 4/2011 | Edme et al. | 702/17 |
| 2011/0085417 A1* | 4/2011 | Ronnow | 367/38 |
| 2011/0085419 A1* | 4/2011 | Ronnow et al. | 367/43 |
| 2012/0113749 A1* | 5/2012 | Edme et al. | 367/38 |

FOREIGN PATENT DOCUMENTS

| | | |
|---|---|---|
| EP | 1337878 | 8/2003 |
| FR | 2738642 A1 | 9/1995 |
| GB | 1256304 A | 12/1971 |
| JP | 57063424 | 4/1982 |
| WO | 8705708 | 9/1987 |
| WO | 0212922 | 2/2002 |

OTHER PUBLICATIONS

International Search Report of PCT Application Serial No. PCT/GB2009/000033 dated Apr. 21, 2009.

Gaston et al., "Long Period Seismographic Sensor," IP.com Journal, Mar. 1971: pp. 3168-3169, <http://ip.com/pubview/IPCOM000074213D>.

Butzer et al., "The Sampling Theorem Itself," An introduction to sampling analysis, Kluwer Academic/Plenum Publishers: New York, ed.: F. Marvasti, 2001: pp. 49-63.

Kappius et al., "Adaptive vector filters for ground roll reduction," CSEG Geophysicists, May 2002: pp. 1-3.

Kragh et al., "Ground roll and polarization," First Break, Sep. 1995, vol. 13(9): pp. 369-378.

Lawton et al., "Research Report: Field tests of 3-component geophones, Part II," CREWES (Consortium for Research in Elastic Wave Exploration Seismology), Department of Geoscience, University of Calgary, 1991: pp. 1-27, <http://www.crewes.org/Reports/1991/1991-01.pdf>.

While et al., "H001: Gravity sample density reduction using gradiometry," EAGE 67th Conference & Technical Exhibition, Jun. 2005: pp. 1-4.

Official Action of Russian Application No. 2010133442 received May 6, 2013: pp. 1-4.

* cited by examiner

SEISMIC SENSOR DEVICES

BACKGROUND

The invention relates to sensor devices.

Seismic data are typically gathered during a survey using an array of detectors. In the case of marine surveys, hydrophones measure pressure fluctuations in the water caused by incoming seismic waves. Geophones measure vector quantities such as displacement, velocity or acceleration. In the case of marine surveying, a plurality of cables or streamers, which are spaced apart typically by about 100 metres, are towed behind a boat. Each cable has detectors spaced along the cable at intervals. In the case of land surveys, a geophone array is laid out on the ground with the geophones in an approximate grid formation. The detector array detects seismic signals from reverberations of a signal from a seismic source, such as an airgun for marine surveys. In Ocean Bottom (OBC or OBS) acquisition, a detector array is fixed on the sea bed. In this case, the source may be an airgun mounted on a boat.

The differences between the different types of surveying are considerable, mainly of the different propagation characteristics of different physical environments. Different problems exist, and have different effects to mitigate, in different surveying environments. For instance, marine surveys involve very significant reflections at the sea bed, where there is a large difference between the acoustic velocities either side of the boundary. Land surveys are subjected to unwanted propagation, including shear waves (also known as S-waves) and Love waves, which are not experienced in marine surveying. As such, different hardware and different data processing techniques are used in the different surveying environments.

There are four main wave types detected by land survey sensors. These are S-waves, Love waves, P-waves (also known as primary waves, because they are the first detected after an earthquake) and Rayleigh waves. Rayleigh and Love waves are horizontally-propagating surface waves, whereas S-waves and P-waves propagate through bodies and thus are of most interest to seismological surveyors. P-waves are compressional waves, Rayleigh waves have a complex motion involving compressional modes and S-waves and Love waves have no compressional component.

Rayleigh and Love waves are together termed 'ground-roll'. These waves are generally considered to be noise and obscure to some degree reflections from boundaries in the geology being surveyed. As such, the removal of the effects of ground-roll from land surveying data is of considerable interest. Various techniques have been developed that reduce the amplitude of the ground-roll and thus enhance the reflections.

A commonly used technique involves deployment of dense field arrays or single sensors of vertical component geophones. Ground-roll is attenuated using dip or velocity filters in further data processing. In order to avoid spatial aliasing, this technique requires at least two geophones per lowest wavelength inline, i.e. in the source receiver direction. Side scattering of the seismic energy can be reduced using two-dimensional array of geophones. Ideally such an array has similar sampling intervals both inline and transverse to the seismic source.

When data from three-component geophones is available, polarisation filtering can be applied. Polarisation filtering identifies the Rayleigh wave part of the ground-roll from the 90 degree phase-shift between its horizontal and vertical component, thereby allowing it to be removed by data processing. Polarisation filtering has been discussed by Kragh and Peardon, 1995, "Ground roll and polarisation", First Break, 13, 9, pages 369-378, First Break, 13, 9, 369-378. ISSN (printed): 0263-5046 and more recently has been promoted by Kappius and Crewe, 2002, "Adaptive Vector Filters for Ground Roll Reduction", CSEG Geophysics, available at the time of writing at http://www.cseg.ca/conferences/2002/2002abstracts/Kappius_R_Adaptive_Vector_Filters_for_Ground_Roll_Reduction_.pdf. An omniphone is a device with horizontal and vertical geophones and a signal processing unit that applies a polarisation filter to the data before output, as is discussed by Lawton, D. C. and M. B. Bertam, 1991, available at the time of writing at http://www.crewes.org/Reports/1991/1991-01.pdf.

Since the slowly propagating ground-roll is locally attenuated, the minimum required spatial sampling depends on the fast seismic reflection. As such, a survey carried out in this way typically requires relatively few geophone stations. However, polarisation filtering techniques do not work well in areas with a complicated near surface as they do not take into account the scattered Love waves present on the horizontal component data.

SUMMARY

According to the invention, there is provided a sensor device adapted to be installed at a land-air interface, the sensor device comprising:
  a fluid-filled housing; and
  a sensor arrangement supported within the housing and coupled directly to the fluid so as to detect movement thereof.

Sensor devices according to the invention can remove the effects of ground-roll at the sensor location, avoiding the need to remove the effects by data processing.

The sensor device may be adapted to be installed at a land-air interface by comprising a coupling device located at a lower part of the housing. Alternatively or in addition, the sensor device may be adapted to be installed at a land-air interface by comprising a level oriented in common with a sensor of the sensor arrangement.

The sensor arrangement may comprise a hydrophone and be absent of geophones and accelerometers.

The sensor arrangement may comprise three hydrophones arranged generally horizontally and in different orientations to one another.

The sensor arrangement may comprise a hydrophone and one or more geophones or accelerometers. Alternatively, the sensor arrangement may be absent of a hydrophone and comprise two or more geophones or accelerometers. In either case, the sensor arrangement may comprise two geophones or accelerometers arranged generally horizontally and in different orientations to one another. In this device, the sensor arrangement may include a vertically aligned geophone or accelerometer and a horizontally aligned geophone or accelerometer. The sensor arrangement may include two horizontally aligned geophones or accelerometers aligned orthogonally to one another.

The sensor device as claimed in any preceding claim may comprise a mechanical decoupling arrangement for mechanically decoupling one or more sensors of the sensor arrangement from the housing. The mechanical decoupling arrangement may comprise a spring and dashpot arrangement. In the case of an acceleration cancelling hydrophone, no mechanical decoupling is needed.

Installations constructed using sensor devices according to the invention also can achieve a given quality of data with significantly fewer sensor devices than the corresponding prior art installations. In particular, installations can require half the number of sensor devices in a given dimension, resulting in a 50% reduction in sensor device numbers for a one dimensional array and a 75% reduction for a two dimensional array.

A second aspect of the invention provided a seismic sensor installation comprising a sensor device installed at a land-air boundary, wherein the sensor device comprises:

a fluid-filled housing; and a sensor arrangement supported within the housing and coupled directly to the fluid as to detect movement thereof.

The sensor device may be installed on top of a land surface at the land-air boundary. Alternatively it may be partially buried in a land surface at the land-air boundary, or provided in a borehole.

The installation may comprise a coupling device located at a lower part of the housing. The installation may comprise a level oriented in common with a sensor of the sensor arrangement.

The installation may comprise a one dimensional array of sensor devices installed at the land-air boundary. Alternatively it may comprise a two dimensional array of sensor devices installed at the land-air boundary.

A third aspect of the invention provides a seismic sensor installation comprising plural sensor devices installed at a land-air boundary, wherein the installation comprises plural sensor devices absent of hydrophones and, adjacent an obstacle, plural sensor devices comprising:

a fluid-filled housing; and a hydrophone and one or more geophones or accelerometers supported within the housing and coupled directly to the fluid as to detect movement thereof.

Installations according the invention also can achieve a given quality of data with significantly fewer sensor devices than the corresponding prior art installations. In particular, installations can require half the number of sensor devices in a given dimension, resulting in a 50% reduction in sensor device numbers for a one dimensional array and a 75% reduction for a two dimensional array.

BRIEF DESCRIPTION OF THE DRAWINGS

Embodiments of the present invention will now be described, by way of example only, with reference to the accompanying drawings of which:

FIGS. 17a and 18a are schematic illustrations of prior art deployments of sensor devices.

In the drawings, like reference numerals denote like elements.

DETAILED DESCRIPTION

Figure 1:
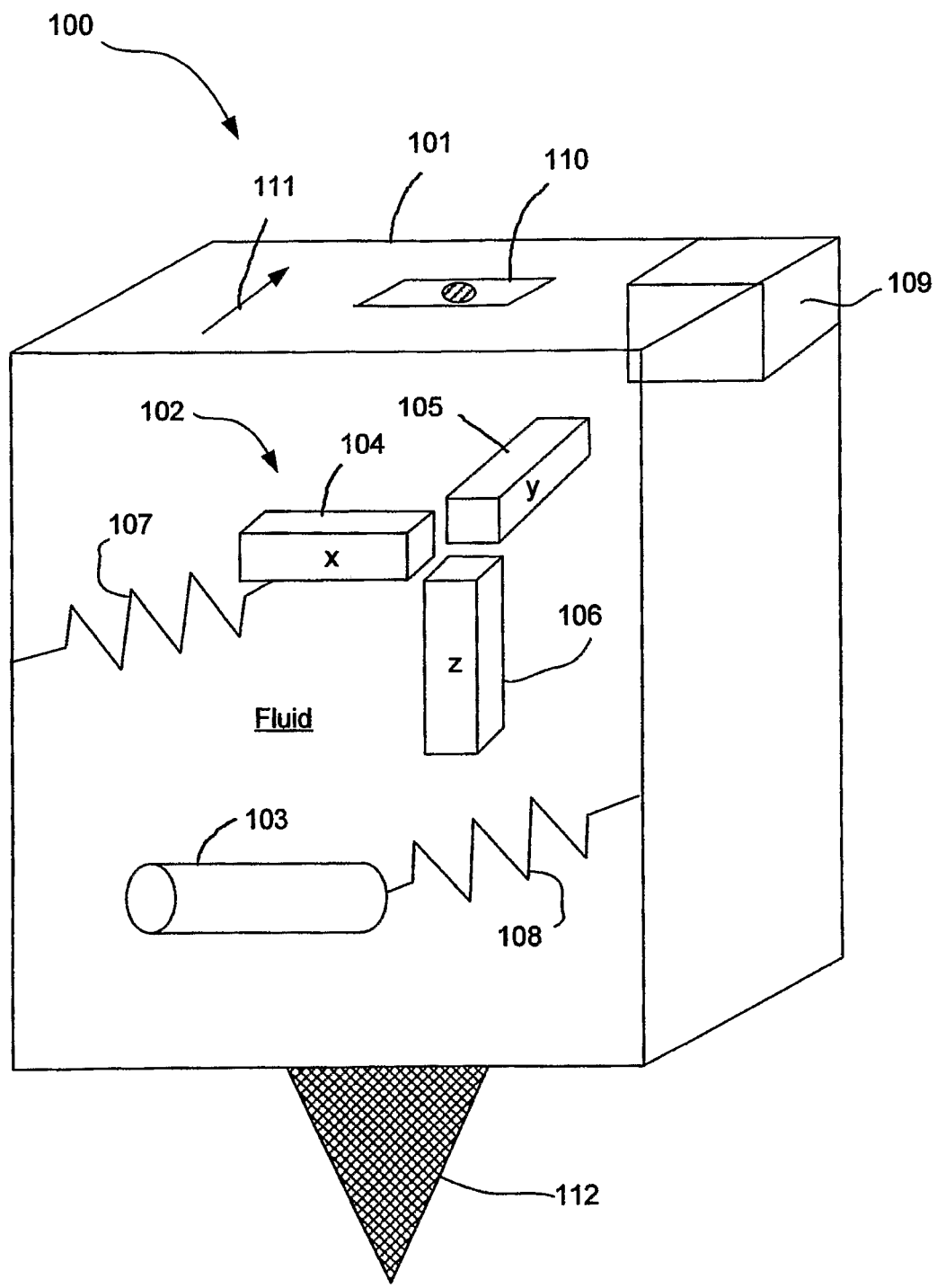
FIGS. 1 and 3 to 12 are schematic illustrations respectively of first to eleventh embodied sensor devices.

A first embodiment of a sensor device is illustrated in FIG. 1.

The sensor device 100 comprises a housing 101, which is a small, closed box. The housing 101 is fluid filled, for instance oil-filled. The fluid is labelled Fluid in the Figure. The housing may be constructed of metal or plastic, for instance.

The sensor device 100 includes a geophone arrangement 102 and a hydrophone arrangement 103.

The geophone arrangement 102 comprises first, second and third geophones 104, 105, 106. The first and second geophones 104, 105 are arranged in the horizontal plane. The first geophone 104 is oriented in an x direction, which is perpendicular to a y direction in which the second geophone 105 is oriented. The third geophone is arranged in a z direction, which is perpendicular to both the first and second geophones. The first, second and third geophones 104, 105, 106 can be termed x, y and z geophones respectively.

The geophones 104, 105, 106 are mechanically decoupled from the housing 101 by a decoupling arrangement 107. The exact form of the decoupling arrangement 107 may not be crucial. It may incorporate a system of springs and dashpots. The effect of the decoupling arrangement 107 is to dampen motion of the housing 101 for frequencies in the seismic bandwidth between 1 Hz and 200 Hz. Through the mechanical decoupling, only motion of the fluid is sensed by the geophones 104-106. The decoupling arrangement 107 also acts to support the geophone arrangement 102 at the correct location and orientation within the housing 101.

The geophone arrangement 102 preferably is neutrally buoyant in the fluid. This results in particularly effective mechanical decoupling of the geophone arrangement 102 from the housing 101.

The hydrophone arrangement 103 comprises a single hydrophone. The hydrophone 103 is mechanically decoupled from the housing 101 by a decoupling arrangement 108. Alternatively, an acceleration cancelling hydrophone 103 is used, in which case no mechanical decoupling arrangement is provided. In either case, the hydrophone arrangement 103 preferably is neutrally buoyant with the fluid. The hydrophone arrangement 103 is attached to the sensor housing 103, by the decoupling arrangement 108 or a separate arrangement in the case of an accelerometer cancelling hydrophone, so as to maintain it at the correct location within the housing 101.

The orientation of the hydrophone 103 in this embodiment is unimportant.

The geophone arrangement 102 and the hydrophone arrangement 103 may be provided by a TV-001 Miniature Vector Sensor package, manufactured by Wilcoxon Research Inc. This sensor package is small and neutrally buoyant. Any other suitable arrangement may be used instead.

The hydrophone arrangement 103 and the geophone arrangement 102 are connected by wiring to an electronics module 109. The wiring is arranged so as to minimise mechanical coupling between the sensor arrangements 102, 103 and the housing 101. The electronics module 109 has interface, data processing and communications functionality. The communications functionality may be wired or wireless and provides connection through a base station to a data collection facility (not shown), discussed below. Alternatively or in addition, the electronics module 109 may include a memory for storing collected data, which can be communicated to a data collection facility at a later time.

The sensor device 100 includes a power supply (not shown), which may for example be a battery or a solar generator and storage arrangement.

The sensor device 100 includes a level 110 mounted on an uppermost surface of the housing 101. The level 110 is aligned with the plane in which the first and second geophones 104, 105 lie. The level provides an indication when the sensor device 100 is level, i.e. Lies horizontally. This allows an operator to ensure that the sensor device is installed so that the geophones are in a truly horizontal plane. An arrow 111 is marked on the uppermost surface of the housing 101.

The arrow is aligned with one of the geophones 104, 105, 106, in this case the first geophone 104. At minimum, the arrow has a known orientation with respect to the geophones 104-106. This allows an operator to ensure that the sensor device is installed with the geophones 104, 105 106 at desired orientations. In turn, this helps an operator to ensure that multiple sensor devices of an installation are in alignment with one another.

The level 110 is an adaptation of the sensor device which makes it suitable for land based application. The arrow 111 also is an adaptation of the sensor device which makes it suitable for land based application.

The sensor device also includes a coupling device 112. In a basic form, this is a conical solid component fixed securely to the underside of the housing 101. The coupling device 112 allows the sensor device 100 to be installed in land. It achieves this by allowing the sensor device 100 to be partially buried by application of force downwards on the sensor device 100 when it is positioned at the surface. The coupling device 112 is an adaptation of the sensor device which makes it suitable for land based application. The coupling device 112 may alternatively comprise three downwardly-projecting pins, as is relatively commonly used with three-component geophones.

The sensor device 100 is installed at a land-air boundary, as is explained below.

As a consequence of the decoupling arrangement 108 (or the use of an acceleration cancelling hydrophone 103) and the decoupling arrangement 107, the geophone and hydrophone sensor arrangements 102, 103 are not exposed to shear waves which reach the housing 101. Instead, the geophones 104, 105, 106 and the hydrophone 103 are exposed only to acoustic waves which propagate through the fluid which fills the housing 101. Consequently, as is explained below with reference to FIGS. 2a to 2d, no shear or Love waves are detected by the hydrophone 103. The electronics module receives from the hydrophone 103 sensor data stemming only from compressional waves, namely P-waves and Rayleigh waves. The resulting dataset is easier to interpret than datasets resulting from conventional land-based sensor devices. The availability of data excluding shear waves and Love waves results in higher quality P-wave reflection data. This has been proven using finite element numerical simulations.

An explanation of the pressure wavefield at the hydrophone 103 for incoming vertical propagating P-wave and S-wave and horizontally propagating Love and Rayleigh waves will now be explained with reference to FIGS. 2a to 2d. For each wave type, the pressure wavefield at the hydrophone 103 has been modelled. The modelling results are shown in FIGS. 2a to 2d for the different wave types respectively.

In these Figures, P denotes signal from the hydrophone 103. The geophones 104-106 were not used in the results. Ux, Uy and Uz, denote respectively x, y and z component of the displacement input at the base of the sensor housing 101, i.e. outside the fluid. The vertical axis denotes pressure (in Pascals) in the case of the hydrophone 103 and displacement (in nanometres) in the case of the input signal. The horizontal axis denotes time in milliseconds. The Figures allow the three dimensional components of the different wavefields to be visualised, and show the resulting hydrophone outputs and their relationship to the input wave.

Figure 2A:
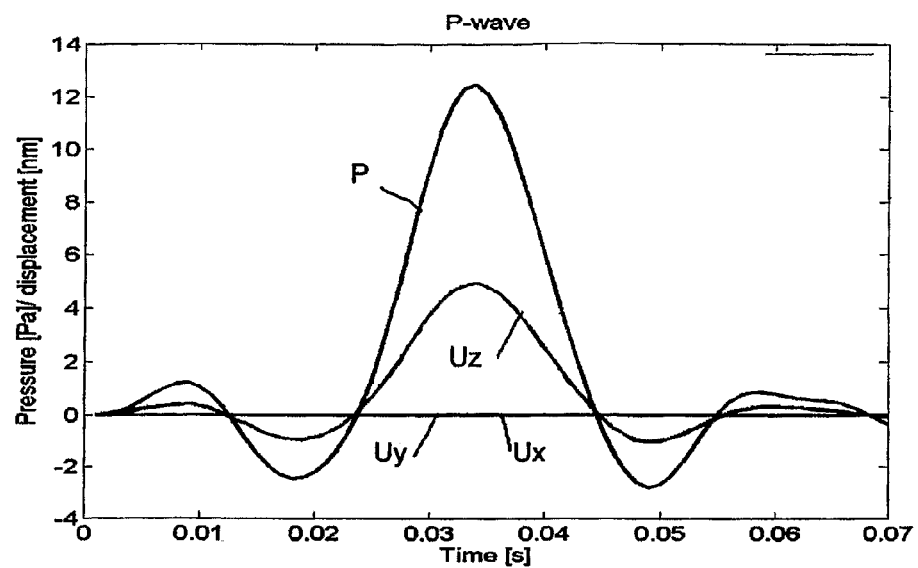
FIGS. 2a to 2d are charts of sensor outputs when the FIG. 1 sensor device is exposed to different types of wave.

As can be seen in FIG. 2a, vertically incident P-waves have a strong z component and no x and y components. These waves provide a substantial signal from the hydrophone 103 having the same shape and being in phase with the Uz component. This clearly shows that the pressure is accurately representative of the incident P-waves.

Figure 2B:
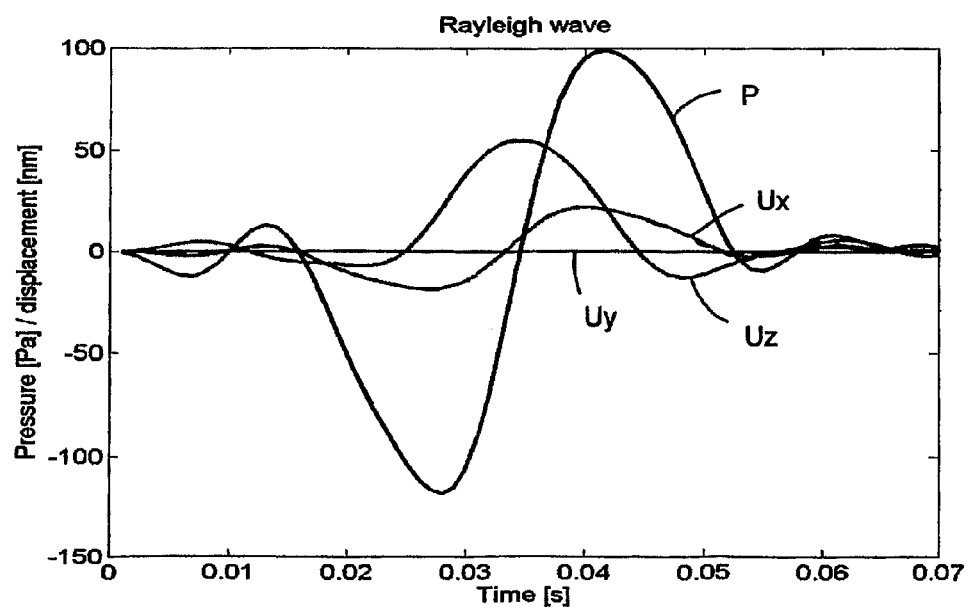

As can be seen in FIG. 2b, incident Rayleigh waves have a substantial Uz component, a less substantial Ux component and a negligible Uy component. The Uz and Ux components are related but are out of phase with one another. This is because Rayleigh waves propagating in a solid have an elliptical particle motion, having inline and vertical components which are 90 degrees out of phase.

The Rayleigh waves are clearly detected by the hydrophone 103. The inline and vertical particle motion in the fluid due to incident Rayleigh waves is dominated by up- and down-going acoustic waves originating when the top and bottom of the housing 101 are deflected by the incident seismic energy and by horizontally propagating acoustic waves originating when the sides of the housing 101 are deflected by the incident seismic energy. The output of the hydrophone 103 is almost the same as the Ux, although there is a slight phase difference because of the time taken for signals to propagate from the bottom of the housing through the fluid to the hydrophone 103.

Figure 2C:
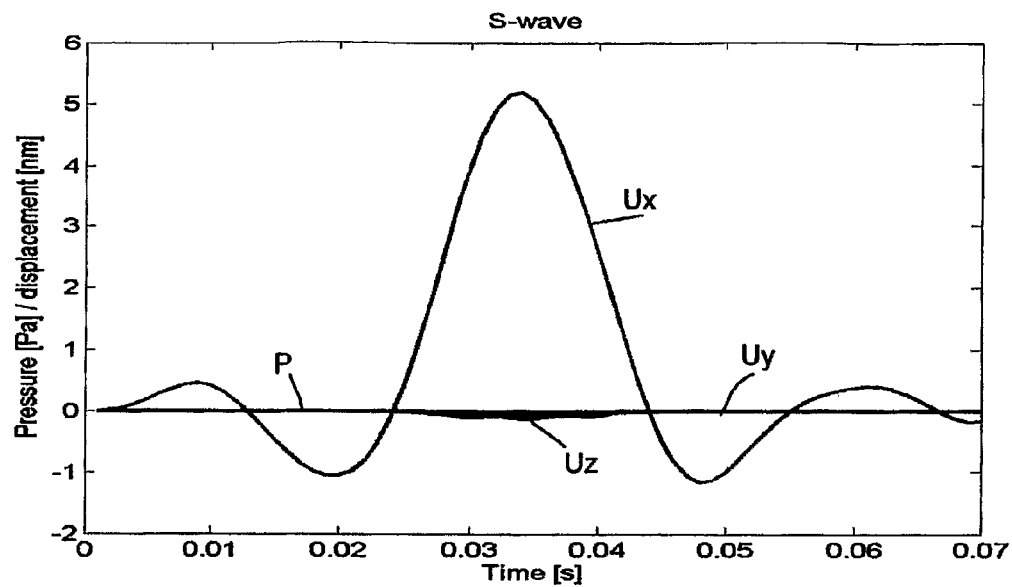
Figure 2D:
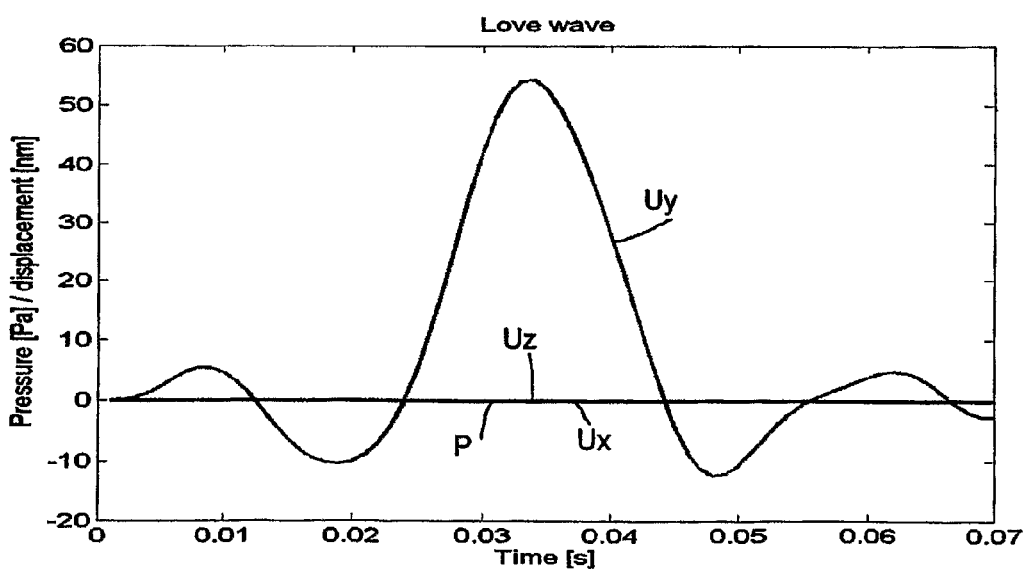

As can be seen in FIG. 2c, incident S-waves provide a substantial signal from the first, x geophone 104 and negligible or no signal from the other sensors. As can be seen in FIG. 2d, incident Love waves provide a substantial signal from the second, y geophone 105 and negligible or no signal from the other sensors. In both cases no signal is recorded by the hydrophone 103.

As will be appreciated from an analysis of FIGS. 2a to 2d, only P-waves and Rayleigh waves, i.e. waves with a compressional component, are measured by the hydrophone 103. This constitutes a very significant advantage compared to conventional land-based sensor devices and can be used to significant advantage, as is explained below.

Referring again to FIG. 1, polarisation filtering is applied to data provided by the geophone arrangement 102 in order to separate the P-wave from the ground-roll.

The polarisation filtering may be carried-out by a polarisation filter included in the electronics module 109, or it may be carried-out at a remote polarisation filter (not shown) in real-time or at a later time. As will be appreciated, the inline and vertical fluid motion components measured by the geophones are 90 degrees out of phase (either or both of the x and y geophones 104, 105 detects the inline signal depending on the direction of incidence of the seismic energy on the housing 101). The full wavefield of fluid due to an incident Rayleigh wave is relatively complicated since corners of the housing 101 generate acoustic waves, which contribute to noise. Although the sensor device 100 is small compared with the smallest wavelength of interest of the seismic signal, Rayleigh amplitude variations along each interface will also generate acoustic waves.

Using the sensor device 100, ground-roll is attenuated by the polarisation filter. Attenuating the ground-roll means that the pressure measurements are indicative of the pressure resulting from pressure waves, and do not include any significant component resulting from shear waves.

This has two advantageous effects. Firstly, the polarisation filtering is more effective than in conventional geophone-based sensor devices since S-waves and Love waves are removed by the physical arrangement of the sensor device 100, i.e. without signal or data processing. Secondly, because only the P-wavefield needs to be sampled (it is not necessary to sample the ground-roll), the spacing between adjacent sensor devices 100 can be greater than in conventional arrangements. Put another way, the spatial sampling of sensor devices 100 needed to provide a satisfactory level of data quality in a seismic survey is dependent on the apparent velocity of reflections from beneath the sensor device 100.

Another benefit of the structure of the sensor device 100 is that, through combination of the hydrophone and vertical geophone recordings, free surface reflection may be removed. Removal of free surface reflection effects results in the separation of the up- and down-going wavefields. This is particular beneficial when the instrument is buried deeper than 1 metre, in which situations the interference of the up- and down-going wavefields can result in a ghost notch in the seismic bandwidth. Using the sensor device 100, on the contrary, the ghost notch can be avoided or at least its effects mitigated.

Figure 3:
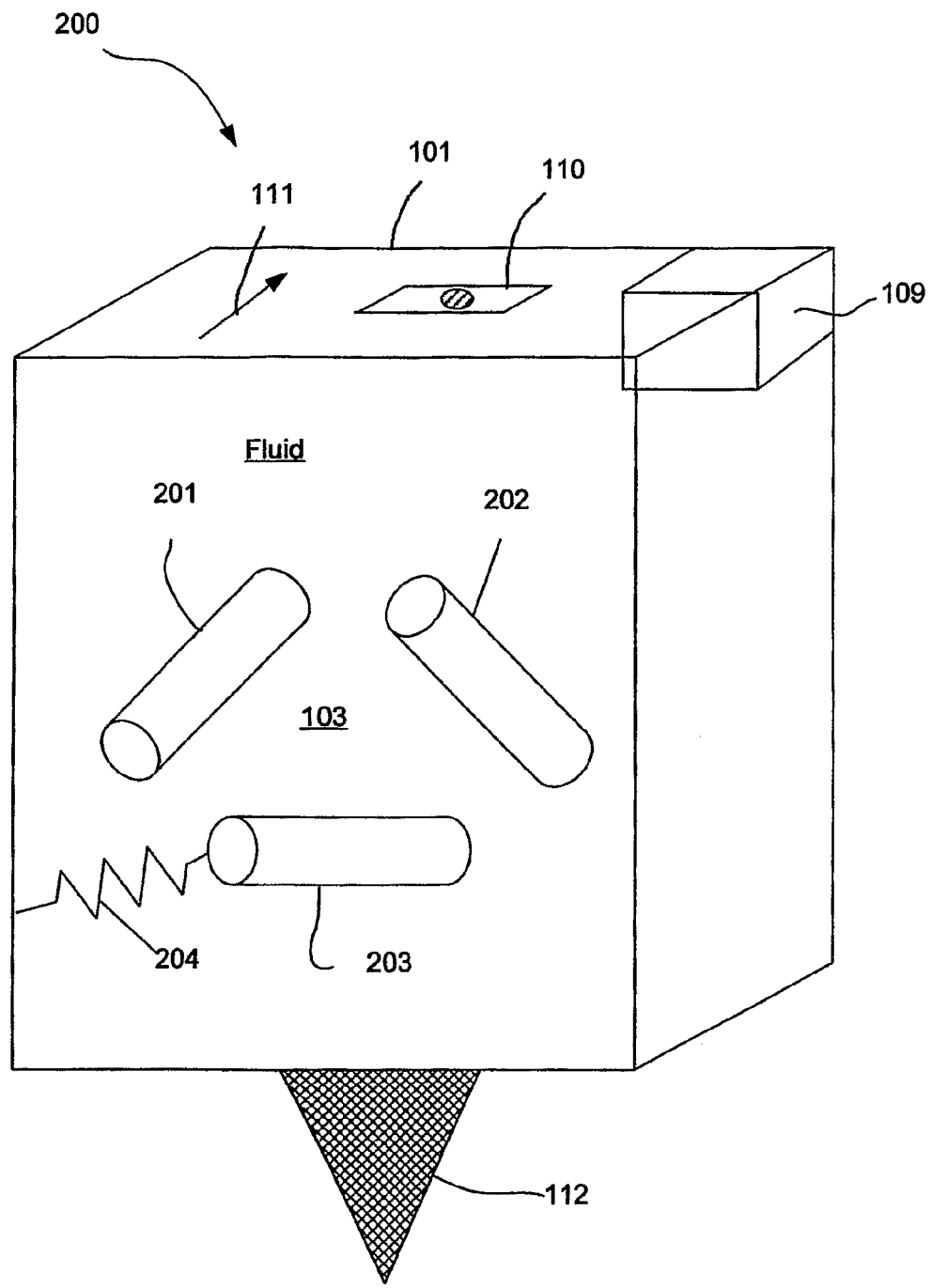

A second embodiment of a sensor device 200 is shown in FIG. 3. Referring to FIG. 3, the hydrophone arrangement 103 of the sensor device includes three hydrophones 201, 202, 203 supported in the housing 101 by a mechanical decoupling arrangement 204, which may comprise springs and dashpots. If acceleration cancelling hydrophones 201-203 are used, no mechanical decoupling arrangement is provided. The hydrophones 201-203 are arranged in the horizontal plane. A level 110 allows a user to determine when the hydrophones 201-203 are properly horizontal. The hydrophones 201-203 are closely spaced, i.e. are located close to one another. The hydrophones 201-203 are oriented at 60° to one another. In this example the hydrophones 201-203 are arranged in the shape of an equilateral triangle, although a different shape may also be suitable. An arrow 111 denotes the orientation of one of the hydrophones 101-103, or at least has a known orientation with respect to the hydrophones 201-203.

This embodiment utilises the fact that the velocity of a fluid is proportional to its pressure gradient. Through differentiation, the pressure gradient in two orthogonal directions can be calculated through:

$$\frac{\partial P(x)}{\partial x_i} = -\rho \frac{\partial^2 u_i(x)}{\partial t^2} \qquad \text{Equation 1}$$

Where:
$u_i(x)$ is the displacement measured at position x in the ith direction;
$\rho$ is the density of the fluid inside the sensor housing
T is time; and
P is measured pressure.

The pressure measurement may be taken from a single hydrophone 201-203 or from the average of all three hydrophones 201-203.

It is known from the multi-channel sampling theorem that a function and its derivative can be interpolated exactly when these are measured at least once a wavelength. The pressure P(t) and its spatial derivative P'(t) sampled uniformly at $t=2k\pi/\Omega$ can be reconstructed by the following equation:

$$P(t) = \sum_{k=-\infty}^{\infty} P\left(\frac{2k\pi}{\Omega}\right) + \left(t - \frac{2k\pi}{\Omega}\right)\frac{\partial P}{\partial x}\left(\frac{2k\pi}{\Omega}\right)\left[\operatorname{sinc}\frac{1}{2}\left(\frac{\Omega t}{\pi} - \right)\right]^2 \qquad \text{Equation 2}$$

$(t \in R, k \in Z)$

This equation was proposed by Butzer, P. L., Schmeisser, G and R. L. Stens, 2001: "An introduction to sampling analysis, in Nonuniform sampling: theory and practice", F. Marvasti ed., F. Kluwer Academic/Plenum Publishers, New York.

The signal processing may be carried-out by the electronics module 109, or it may be carried-out remotely in real-time or at a later time.

As a consequence of the above, the FIG. 3 sensor arrangement can be seen clearly to allow interpolation of recorded pressure field at any point between two instruments up to a wavelength apart. This is a considerable improvement over conventional geophone recording, which requires two stations per wavelength.

In the case of two-dimensional arrays, a similar reduction in the cross-line direction may be achieved using the sensor devices 200. As a result two-dimensional arrays using sensor devices 200 may require up to four times fewer instruments than conventional geophones arrays while maintaining the same data quality. This is turn leads to a large reduction in the amount of hardware needed for a field deployment, and a corresponding reduction in power consumption. The number of data channels needed for a field deployment of a given size also is reduced using the sensor devices 200, and there is a corresponding reduction in the amount of data that is required to be stored. A simple two-dimensional interpolation algorithm comprises interpolating the data in one direction using an appropriate one-dimensional algorithm and then interpolating the data in the other direction. Other algorithms may alternatively be used.

The one-dimensional multiple channel interpolation theorem given by Equation 2 above applies to an infinite number of regular spaced receivers. However, a relatively small number of sensor devices 200 can be deployed without significant loss of accuracy. For instance, a one dimensional array of 64 sensor devices 200 can be used without any significant accuracy loss. For the interpolation of a smaller number of receivers and irregular spaced data, other algorithms may be used instead. A suitable algorithm might be based on the MIMAP algorithm described by While, Biegert and Jackson in "Gravity Sample Density Reduction Using Gradiometry", EAGE 67th Conference & Technical Exhibition—Madrid, Spain, 13-16 Jun. 2005.

Figure 4:
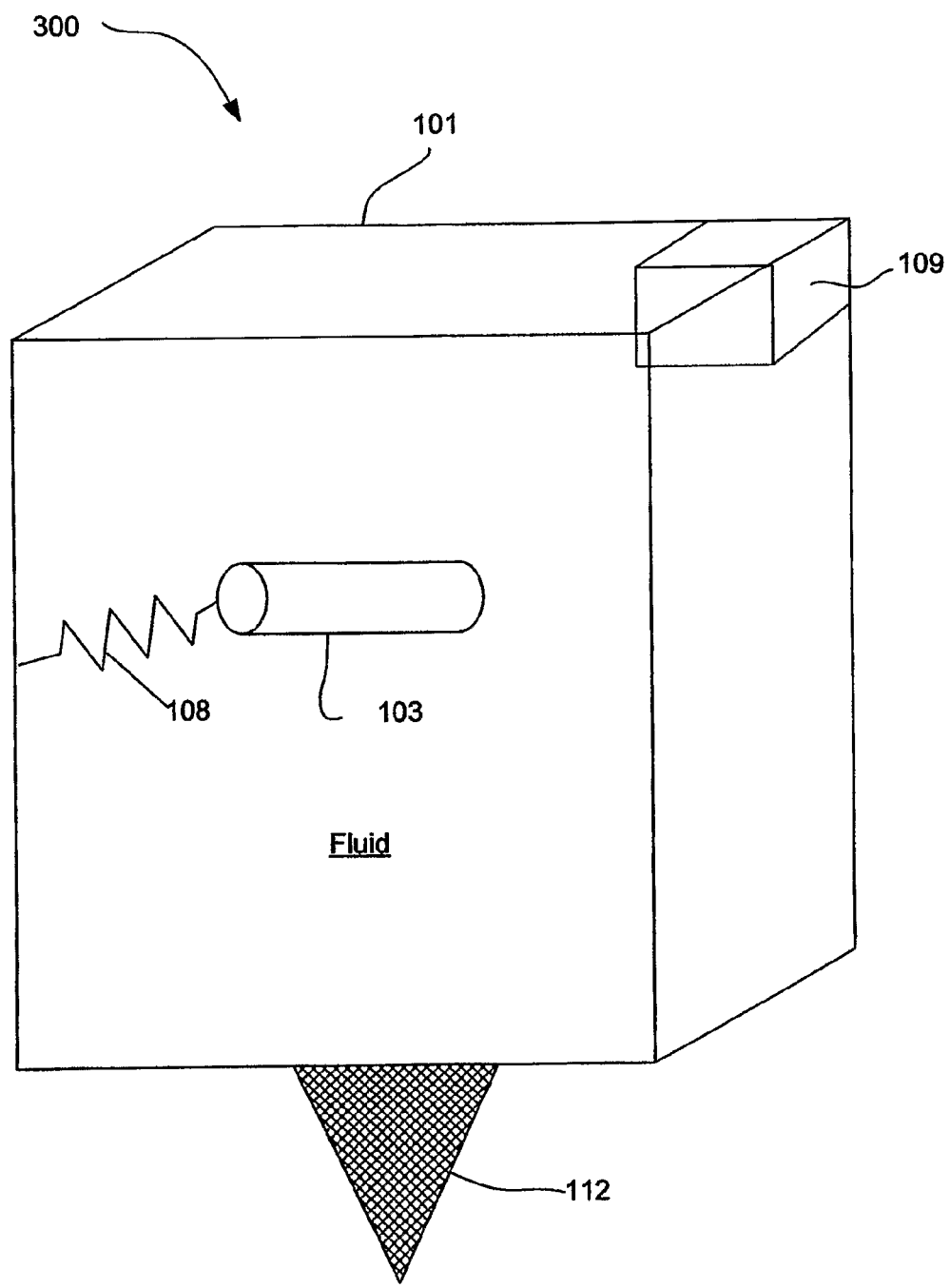

A third embodiment of a sensor device 300 will now be described with reference to FIG. 4. Referring to FIG. 4, the sensor device 300 comprises a single hydrophone 103 connected to a housing 101 by a mechanical decoupling arrangement 108, as with the sensor device 100. No level or arrow are included.

By virtue of its structure, the sensor device 300 is able to perform compressional wave recording which are not contaminated with shear waves. The resulting data is relatively easy to interpret. However, two sensor devices 300 are required to be deployed per wavelength of signals of interest in order to ensure proper sampling of the ground-roll.

Figure 5:
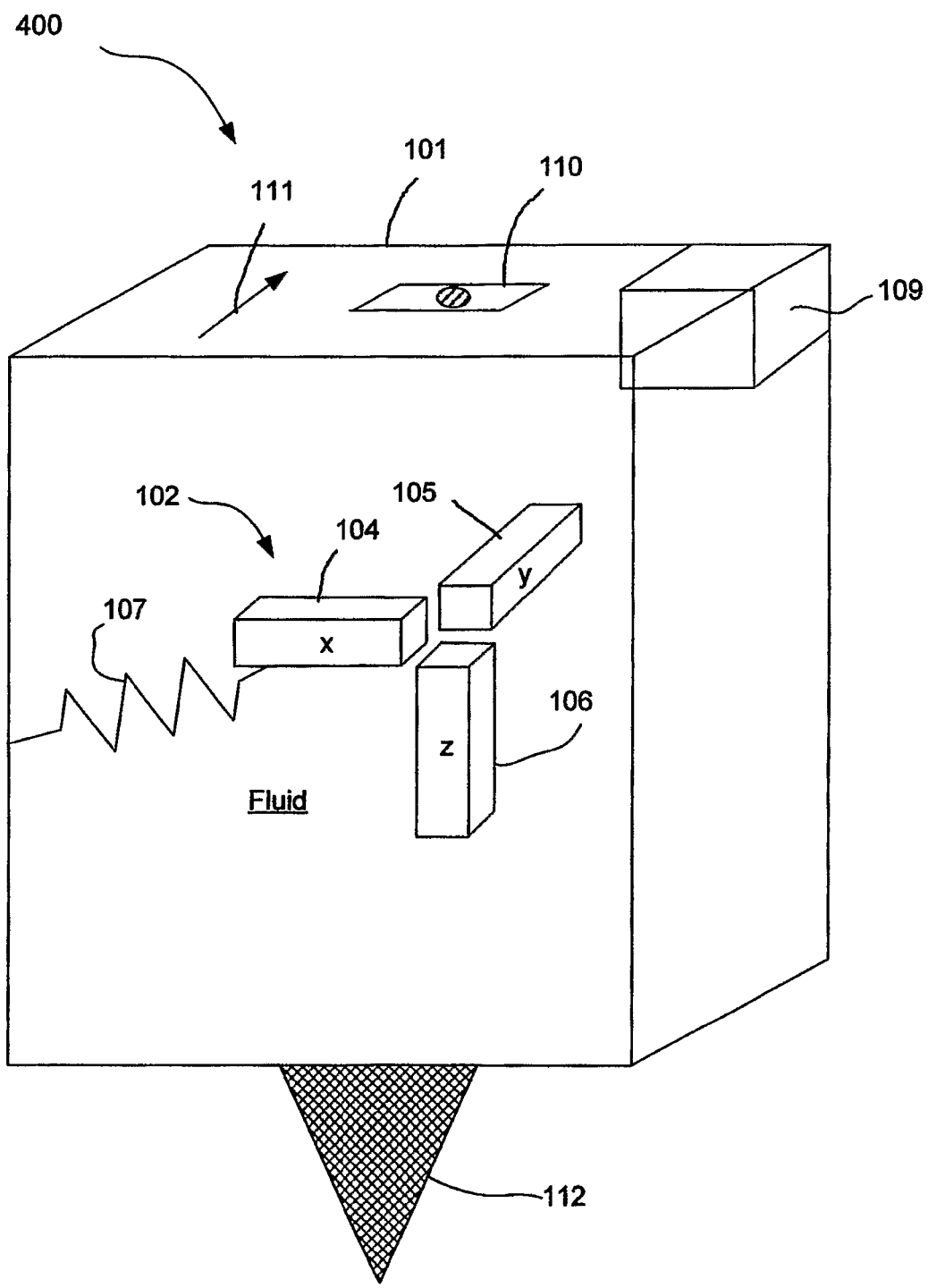

A fourth embodiment of a sensor device 400 will now be described with reference to FIG. 5. The physical arrangement of the sensor device 400 is identical to that of the sensor device 100 except that no hydrophone is present in the sensor device 400.

Polarisation filtering is applied to data provided by the geophone arrangement 102 in order to separate the P-wave from the ground-roll. The polarisation filtering may be carried-out by a polarisation filter included in the electronics module 109, or it may be carried-out at a remote polarisation filter (not shown) in real-time or at a later time. As will be appreciated, the inline and vertical fluid motion components measured by the geophones are 90 degrees out of phase (either or both of the x and y geophones 104, 105 detects the inline signal depending on the direction of incidence of the seismic energy on the housing 101). The full wavefield of fluid due to an incident Rayleigh wave is relatively complicated since corners of the housing 101 generate acoustic waves, which contribute to noise. Although the sensor device 400 is small compared with the smallest wavelength of interest of the seismic signal, Rayleigh amplitude variations along each interface also generate acoustic waves.

Because only the P-wavefield needs to be sampled (the ground-roll does not need to be sampled), the spacing between adjacent sensor devices 400 can be greater than in conventional arrangements. Put another way, the spatial sampling of sensor devices 400 needed to provide a satisfactory level of data quality in a seismic survey is dependent only on the apparent velocity of reflections from beneath the sensor device 400, not on the apparent velocity of ground-roll.

Figure 6:
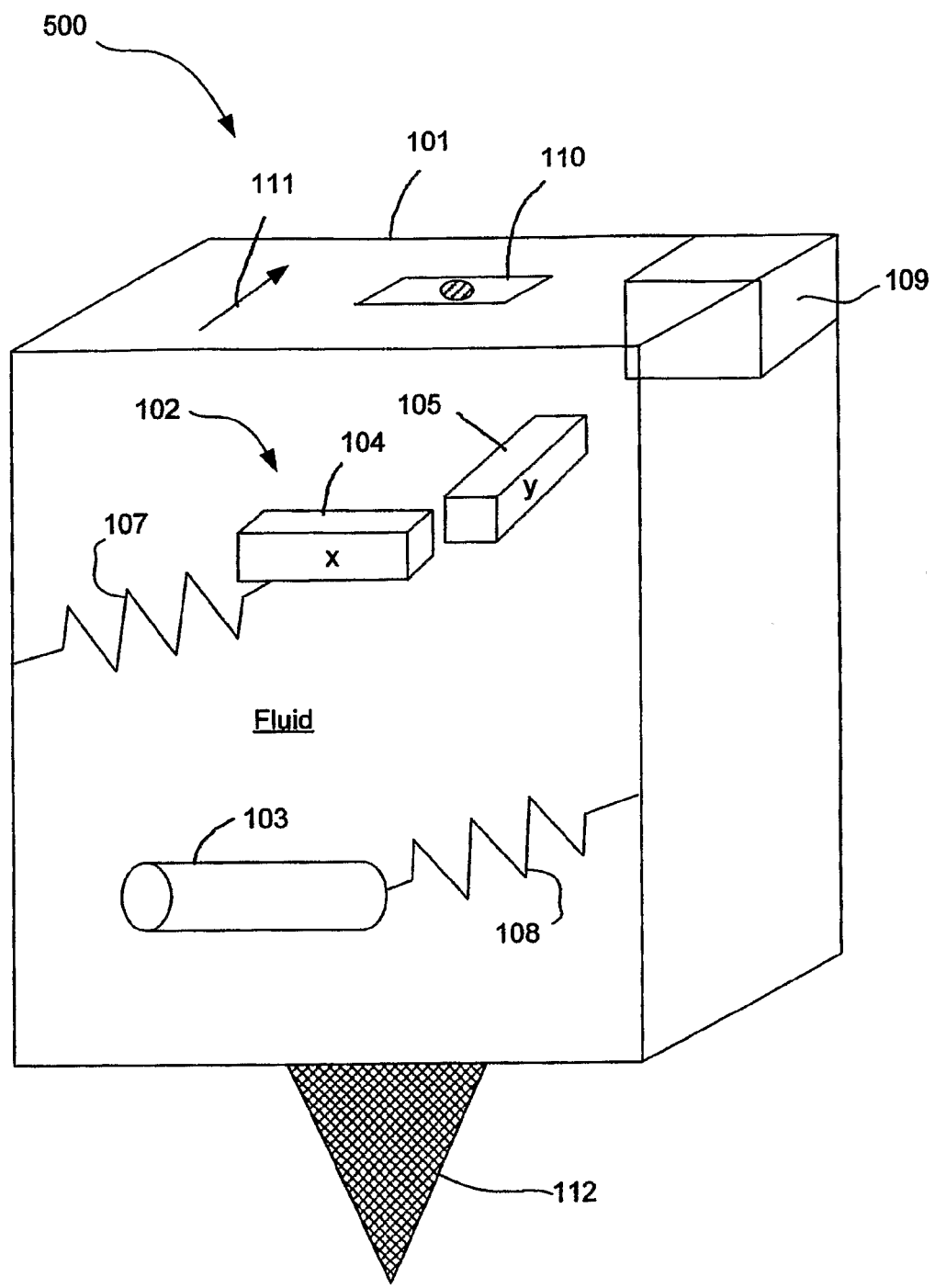

A fifth embodied sensor device 500 will now be described with reference to FIG. 6. The structure of the sensor device 500 is the same as that of the sensor device 100 except that the sensor device 500 does not include a z geophone. This sensor device 400 has all the effects and advantages discussed above in relation to the sensor device 100 except that the absence of the z geophone results in it not so straightforward to obtain separation of the up- and down-going wavefields.

Figure 7:
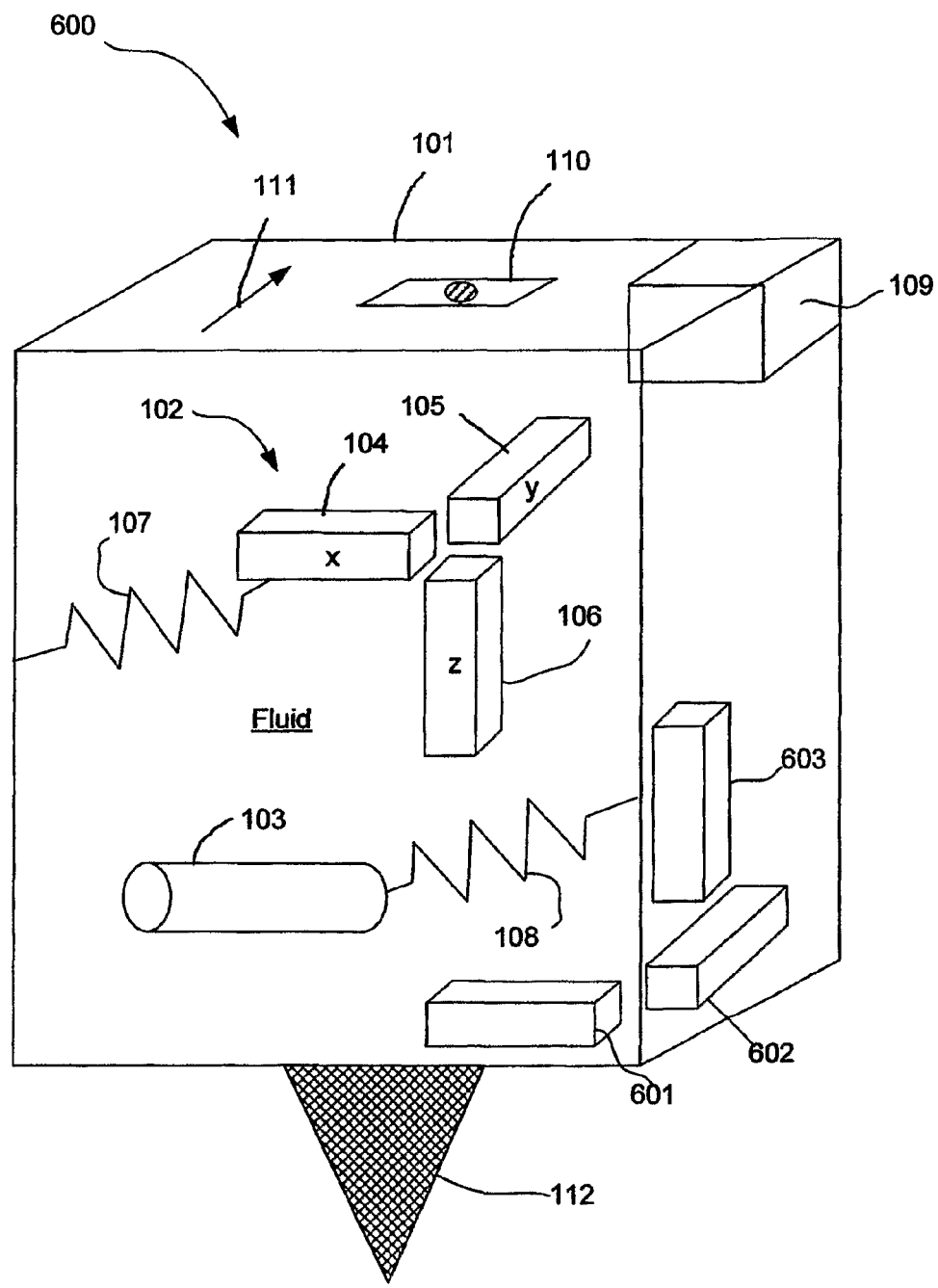

A sixth embodied sensor device 600 will now be described with reference to FIG. 7. The sensor device 600 is the same as the sensor device 100 except that it includes three additional, external geophones. A first, x, external geophone 601, a second, y, external geophone 602 and a third, z, external geophone 603 are connected externally to the housing 101. The external geophones 601-603 have the same orientation as their internal counterparts 104-106, but are mechanically coupled to the housing rather than being mechanically decoupled from it. Alternatively, the external geophones 601-603 may be supported close to the housing 101 but coupled directly to some component of the sensor device 600 other than the housing 101. The external geophones 601-603 are connected to provide sensor signals to the electronics module 109.

Instead of external geophones 601-603 having the same orientation as their internal counterparts 104-106, they may be differently orientated, as long as their relative orientations are known.

The external geophones 601-603 sense the full seismic wavefield, and thus incorporate ground-roll in their outputs. This allows full P- and S-wave separation can be carried out, either by the electronics module 109 or in post processing. Separation involves differentiating the output of the internal geophones 104-106 with the output of the external geophones 601-603 after applying appropriate corrections for sensor sensitivity and impedance.

Figure 8:
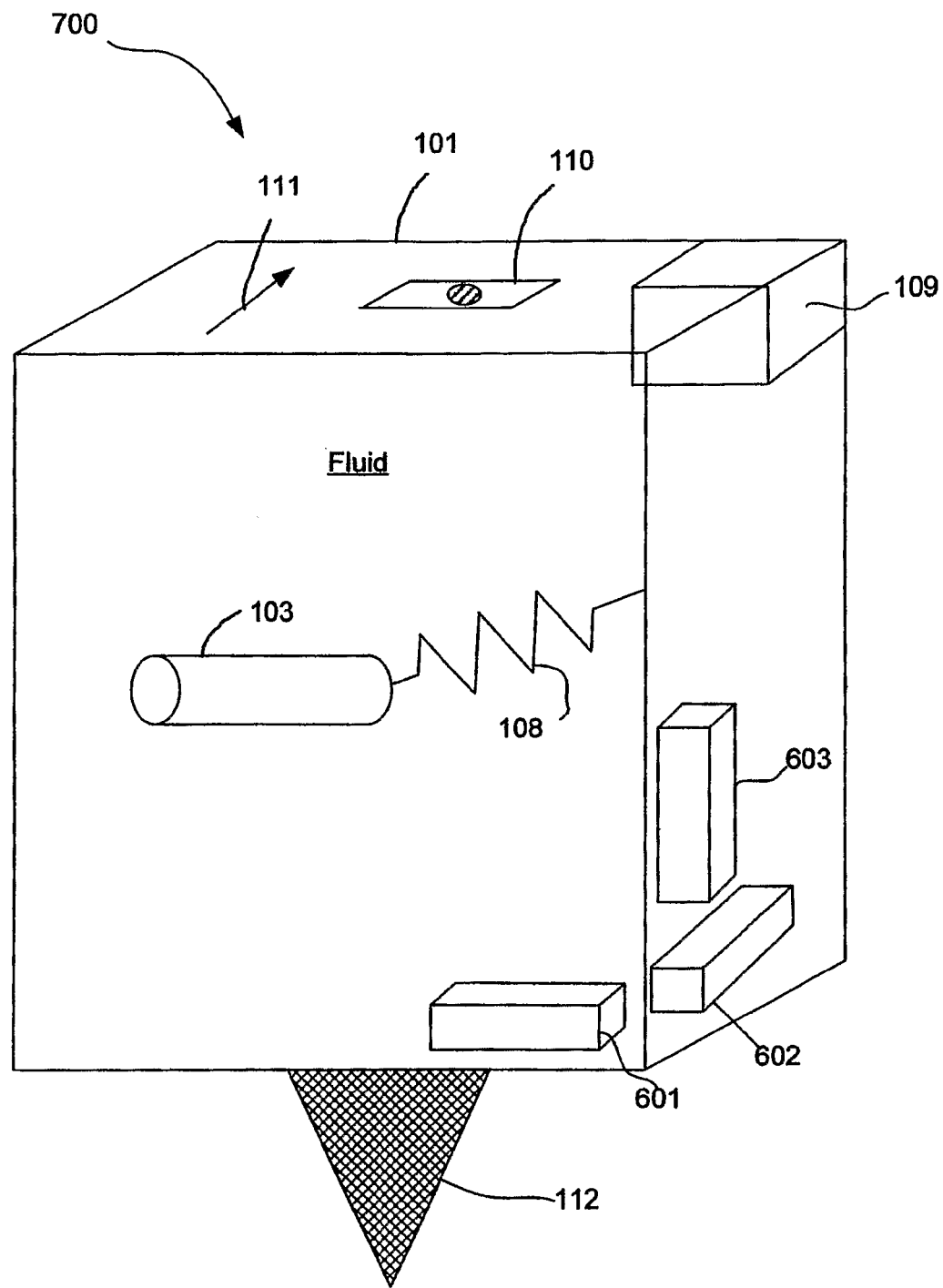

A seventh embodied sensor device 700 will now be described with reference to FIG. 8. The sensor device 700 is the same as the sensor device 600 except that it omits the internal geophone arrangement 102.

This sensor device 700 allows a limited separation of P and S waves.

Figure 9:
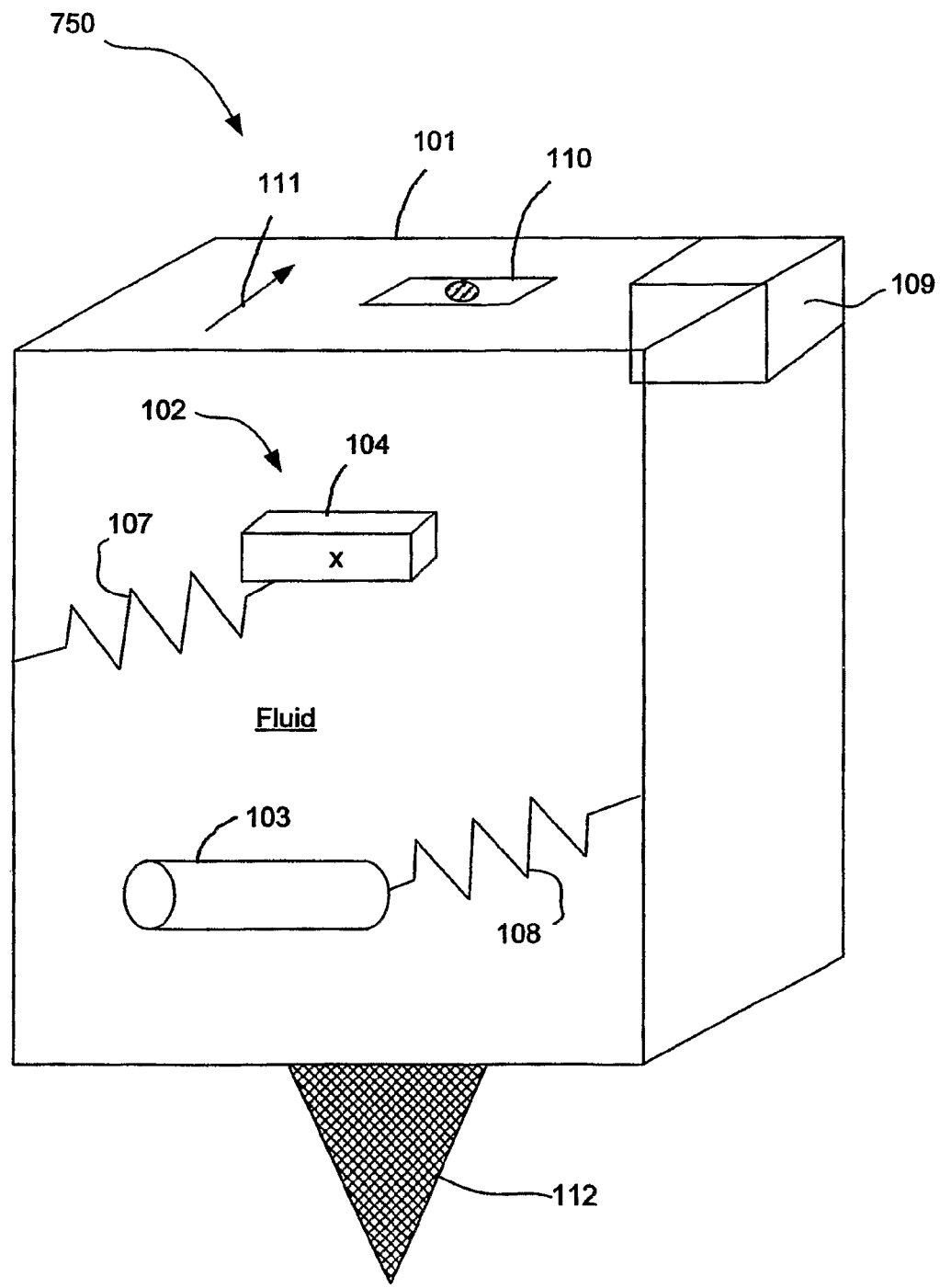

An eighth embodied sensor device 750 will now be described with reference to FIG. 9. The sensor device 750 is the same as the sensor device 500 except that it omits the y geophone 105. This sensor device 750 can be used to the same effectiveness when it can be ensured that the x geophone 104 is in alignment with the seismic source used in carrying out a seismic survey. If the alignment of the sensor device in relation to the seismic source used in carrying out a seismic survey is not known, or can vary, the sensor device 500 is more appropriate. The sensor device 500 is more appropriate also if the area being surveyed has a lot of side scatter, making the use of 2D arrays particularly beneficial.

Figure 10:
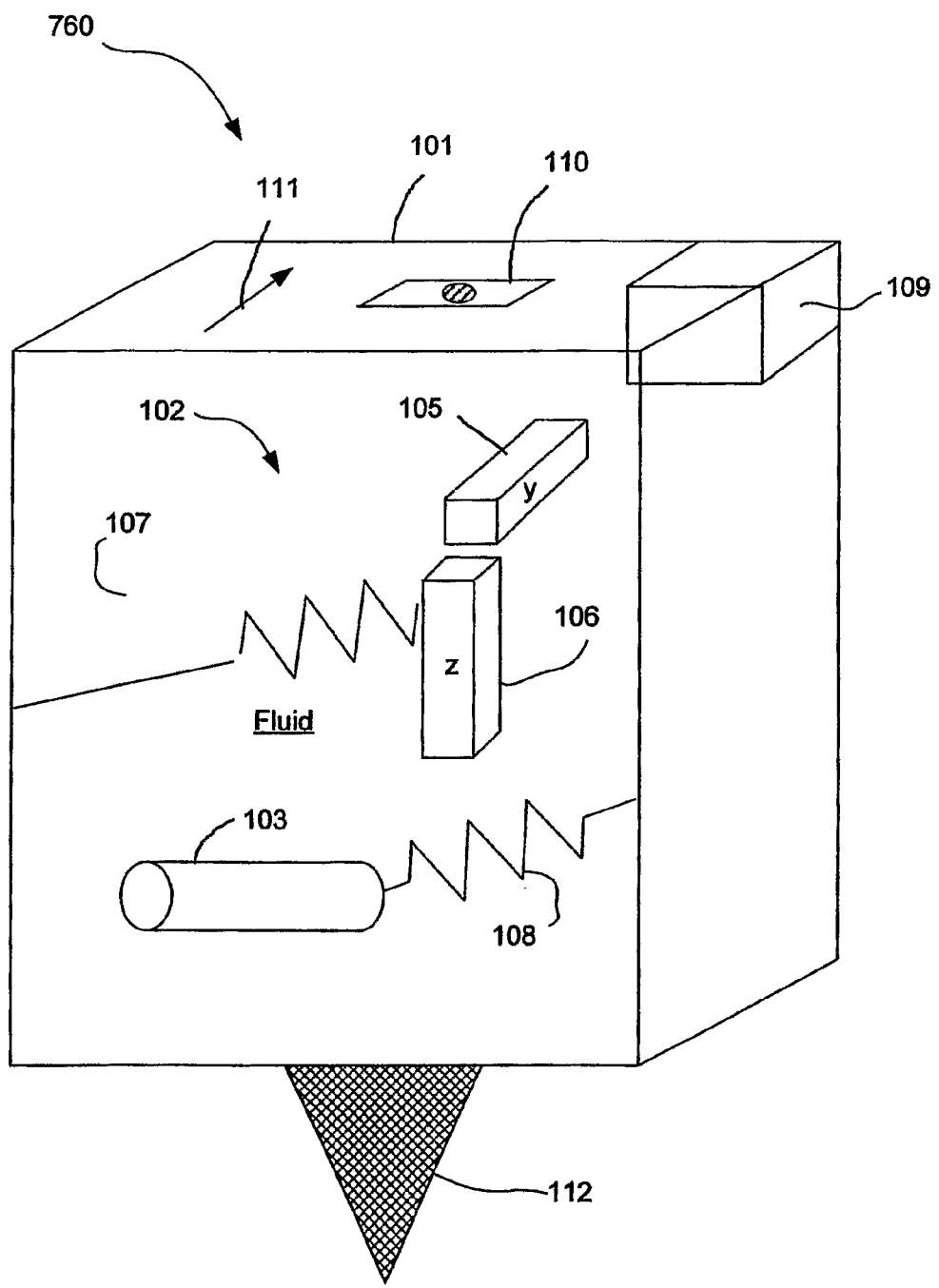

A ninth embodied sensor device 760 will now be described with reference to FIG. 10. The sensor device 760 is the same as the sensor device 100 described above with reference to FIG. 1 but omitting the x component geophone 104. This sensor device 750 can be used to the same effectiveness when it can be ensured that the y geophone 105 is in alignment with the seismic source used in carrying out a seismic survey. If the alignment of the sensor device in relation to the seismic source used in carrying out a seismic survey is not known, or can vary, the sensor device 500 is more appropriate.

Figure 11:
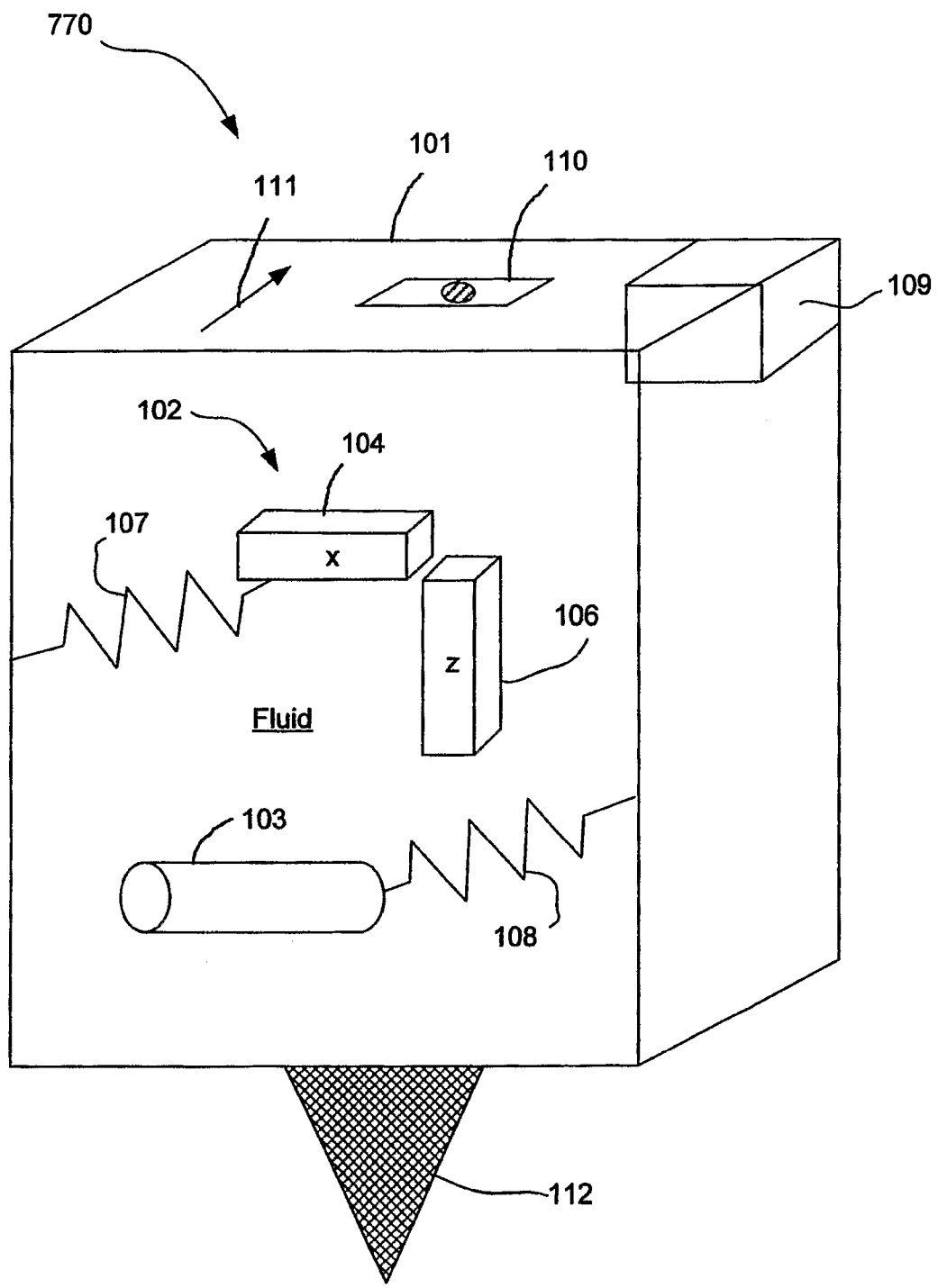

A tenth embodied sensor device 770 will now be described with reference to FIG. 11. The sensor device 770 is the same as the sensor device 100 described above with reference to FIG. 1 but omitting the y component geophone 105. It will be appreciated that the sensor devices 760 and 770 are the same except that the arrow 111 is in a different orientation with respect to the horizontal geophone 104 or 105 respectively.

Figure 12:
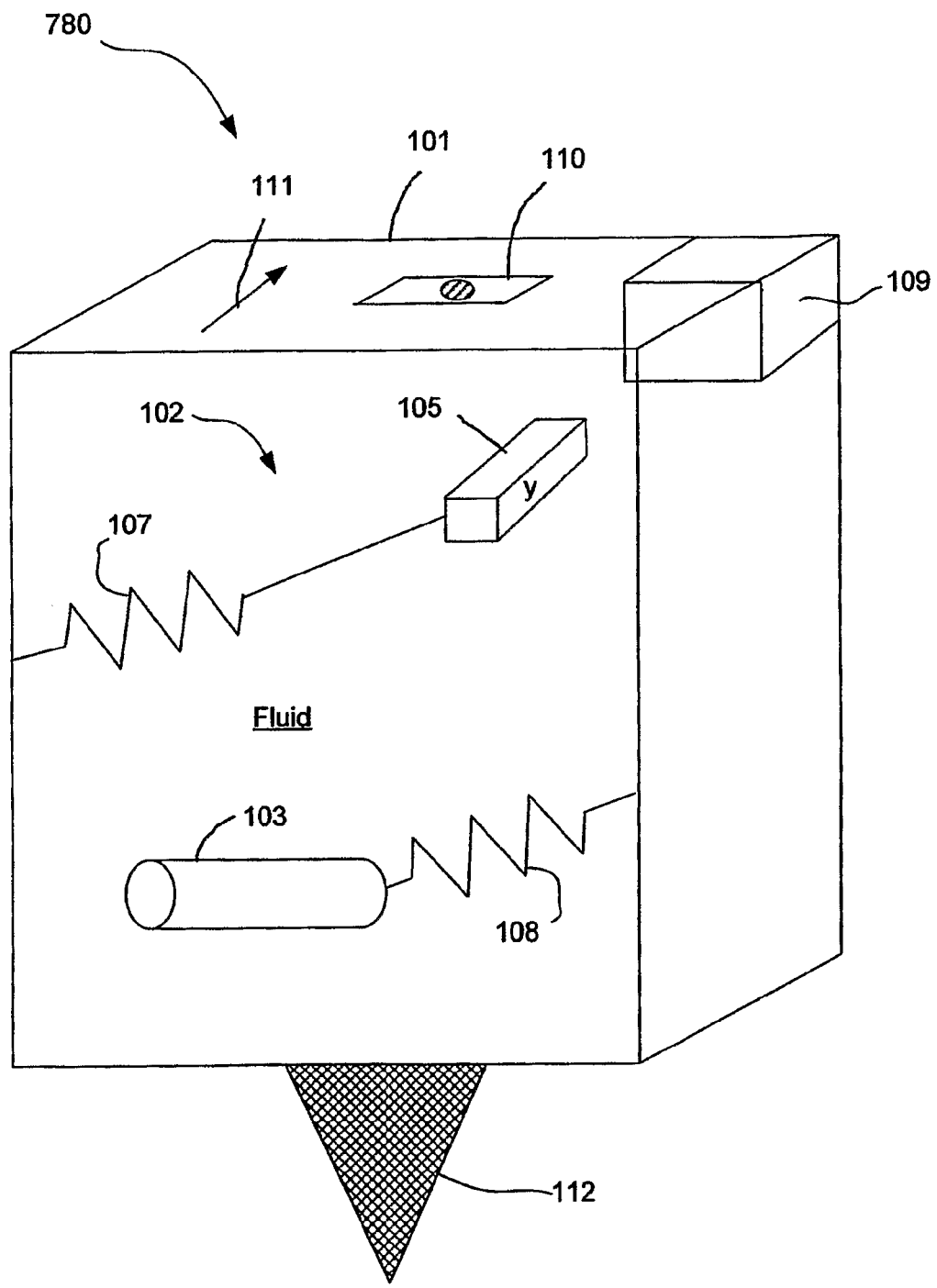

An eleventh embodied sensor device 780 will now be described with reference to FIG. 12. The sensor device 780 is the same as the sensor device 500 described above with reference to FIG. 6 but omitting the x component geophone 104.

It will be appreciated that the above embodiments are not exhaustive and that other combinations of geophone and hydrophone sensors are part of the invention, within the scope of the appended claims.

Embodied sensor device installations will now be described. There are a number of alternative options for installing sensor devices at a land-air interface.

Figure 13:
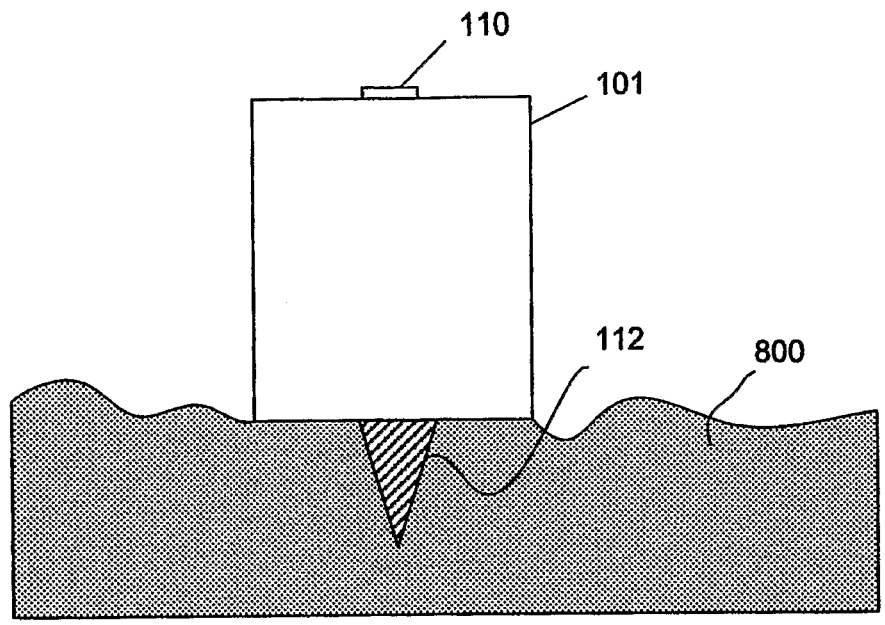
FIGS. 13 to 16 are schematic illustrations of embodied installations incorporating a sensor device of one of FIGS. 1 and 3 to 12.

A first sensor device installation is shown in FIG. 13. Here, the housing 101 of any one of the sensor devices described above is placed on top of a surface of land 800. The coupling device 112 is buried in the land. This provides mechanical coupling between the land 800 and the housing 101, which is fluidly coupled to the sensor arrangement(s) included in the sensor device. A level 110 and an arrow (not visible in the Figure) allow a user to install the sensor device at an appropriate orientation. The sensor device may be installed temporarily or permanently.

Figure 14:
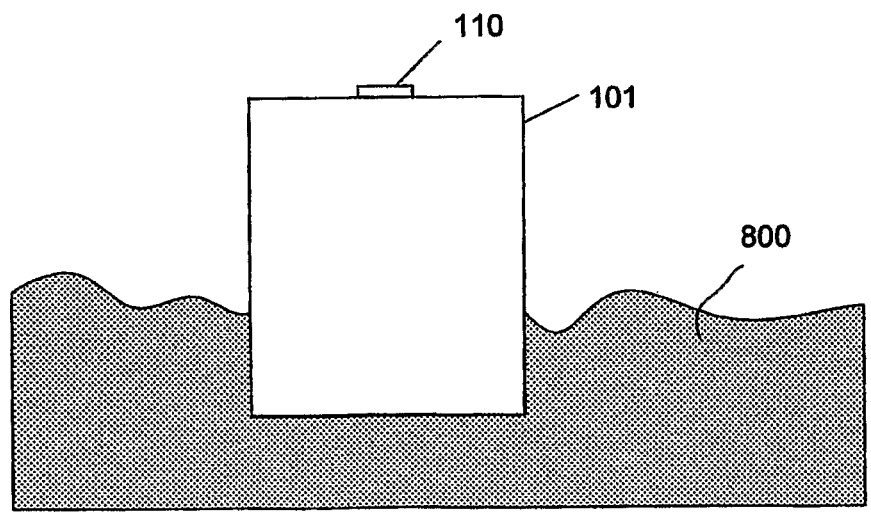

A second installation is shown in FIG. 14. Here, the housing 101 of any one of the sensor devices described above is partially buried at the surface of land 800. No coupling device is present. The partial surrounding of the housing 101 by the land provides sufficient mechanical coupling between the land 800 and the housing 101, which is fluidly coupled to the sensor arrangement(s) included in the sensor device, that a coupling device is not required. A level 110 and an arrow (not visible in the Figure) allow a user to install the sensor device at an appropriate orientation. The sensor device may be installed temporarily or permanently.

Figure 15:
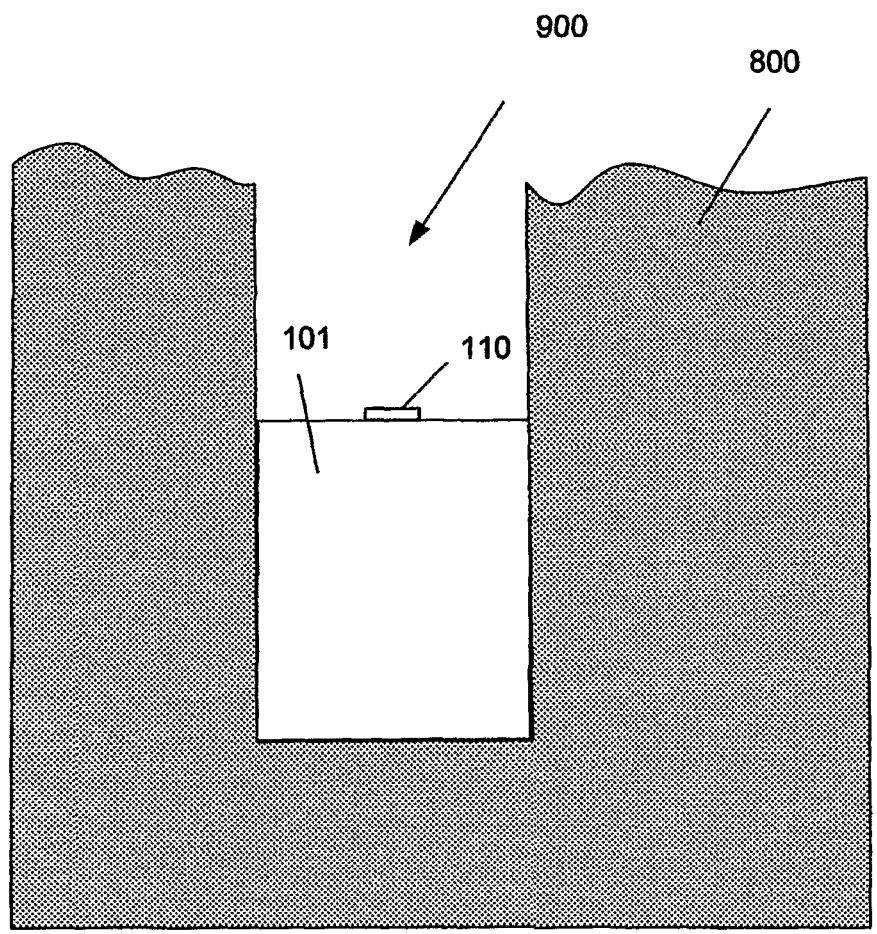

A third installation is shown in FIG. 15. Here, the housing 101 of any one of the sensor devices described above is located beneath the surface of land 800 at the bottom of a borehole 900. No coupling device is present. The surrounding of the housing 101 by the walls of the borehole 900 provides sufficient mechanical coupling between the land 800 and the housing 101, which is fluidly coupled to sensor arrangement(s) included in the sensor device, that a coupling device is not required. A level 110 and an arrow (not visible in the Figure) allow a user to install the sensor device at an appropriate orientation. Alternatively, if the borehole 900 is known to be at the correct orientation (typically, vertical), the level 110 can be omitted. This installation requires there to be a good fit between the borehole 900 and the housing 101. The borehole may be relatively shallow at a depth of a few metres or less, for instance about 1 metre deep. The sensor device may be installed temporarily or permanently.

Figure 16:
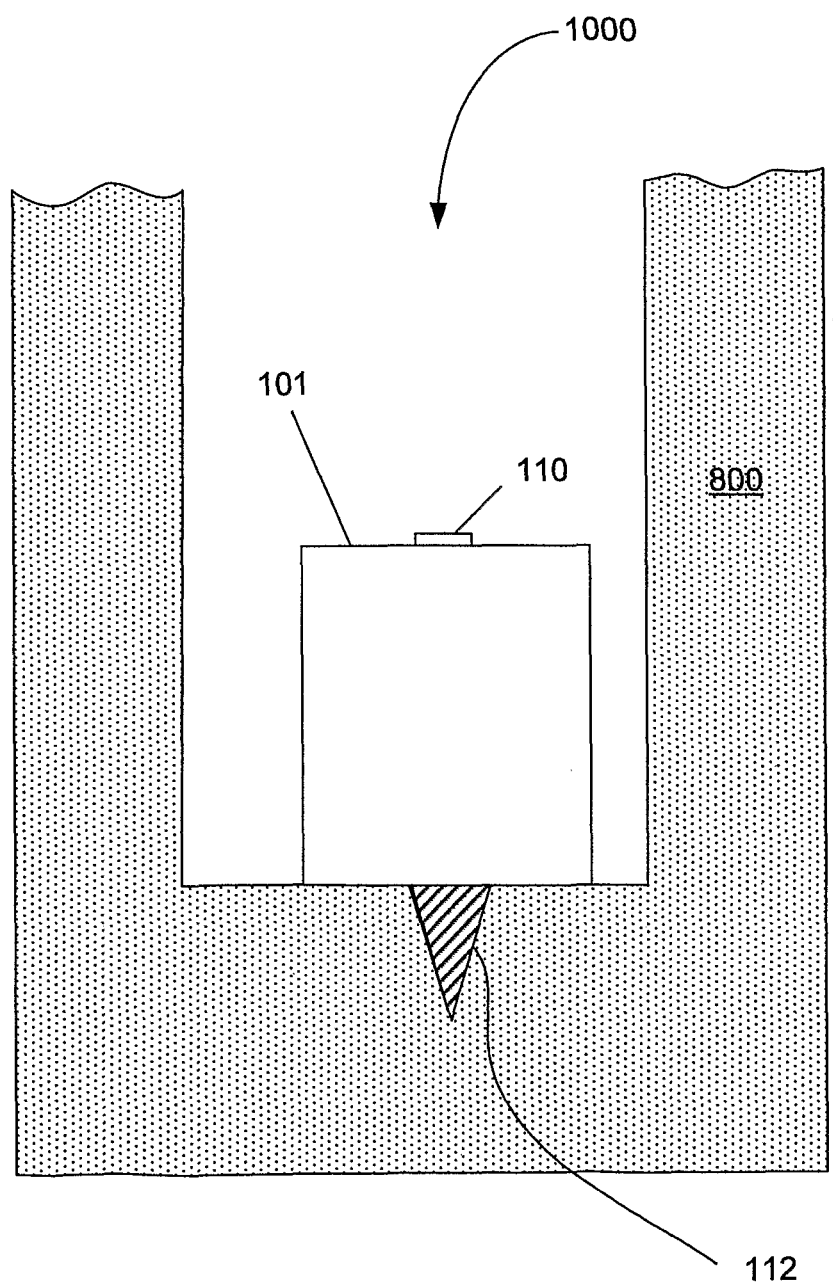

A fourth installation is shown in FIG. 16. Here, the housing 101 of any one of the sensor devices described above is located beneath the surface of land 800 at the bottom of a deep borehole 1000. The borehole may be many metres or many hundreds of metres deep. It may have been dug for some purpose other than specifically to accommodate the sensor device. The coupling device 112 is buried in the land 800 at the bottom of the borehole 1000. A level 110 and an arrow (not visible in the Figure) allow a user to install the sensor device at an appropriate orientation. If installation by a user is not practicable (which would normally be the case with deep, narrow boreholes), the level 110 and arrow may be omitted. The sensor device may be installed temporarily or permanently. This installation is more appropriate for permanent sensor device installation.

FIG. 17*a* illustrates a conventional, prior art deployment of sensor devices. The deployment 1100 includes plural vertical component geophone sensor devices, indicated at Z. Sensor devices Z are located in a one dimensional array. Each sensor device Z is separated from adjacent sensor devices by a distance d. The sensor devices are commonly connected to a data acquisition centre.

Figure 17B:
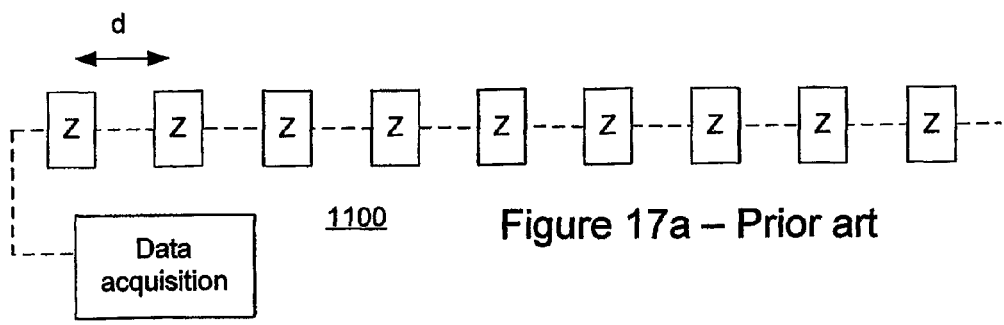
FIGS. 17b to 17d and 18b to 18e are schematic illustrations of embodied deployments of sensor devices.
Figure 17B:
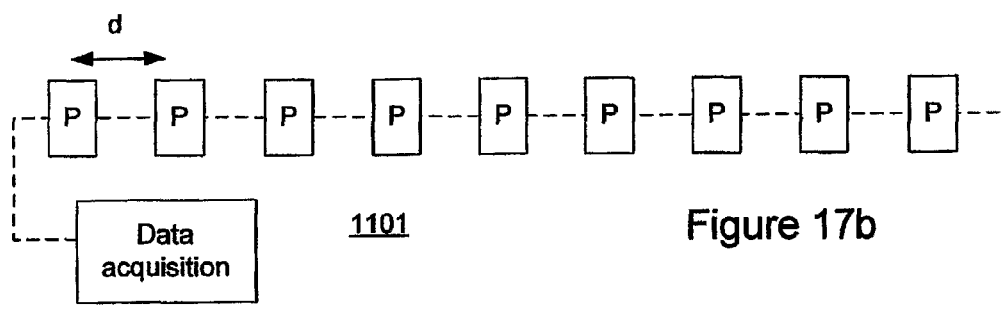
Figure 17C:
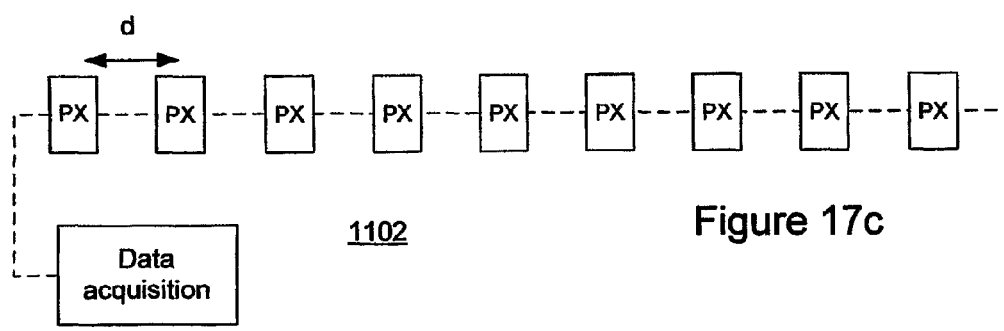
Figure 17D:
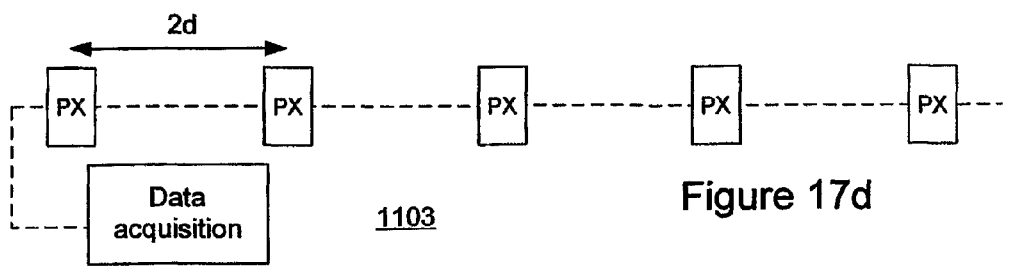

First to third embodiments of deployments of sensor devices will now be described with reference to FIGS. 17*b* to 17*d* respectively.

The first embodied deployment 1101 is the same as the conventional deployment 1100 except that the sensor devices P are the sensor devices 300 described above with reference to FIG. 4. These sensor devices P measure pressure only, i.e. they do not measure velocity. As is explained above, a survey carried out using this deployment gives a data quality after processing comparable to the deployment 1100 but without recording shear waves.

The second embodied deployment 1102 is the same as the conventional deployment 1100 except that the sensor devices PX are the sensor devices 300 described above with reference to FIG. 9. The sensor spacing d is the same as with the deployments 1100 and 1101. The data quality after processing from a survey carried-out using the second embodied deployment 1102 is superior to that obtained by a survey carried-out using the conventional deployment 1100. It is superior also to that obtained by a survey carried-out using the first embodied deployment 1101.

The third embodied deployment 1103 is the same as the second embodied deployment 1102 except that in the third deployment 1103 the sensor devices PX are separated by a distance 2d which is twice the distance d of the separation of the sensors PX of the second embodied deployment 1102. A survey carried-out using the third embodied deployment 1103 provides data having a quality similar to that provided by the conventional deployment 1100.

A conventional deployment 1200 including a two dimensional array of sensor devices is shown in FIG. 18*a*. Here, vertical component geophone sensor devices Z are shown in a grid array with an equal spacing d between adjacent sensor devices Z in both dimensions.

Figure 18B:
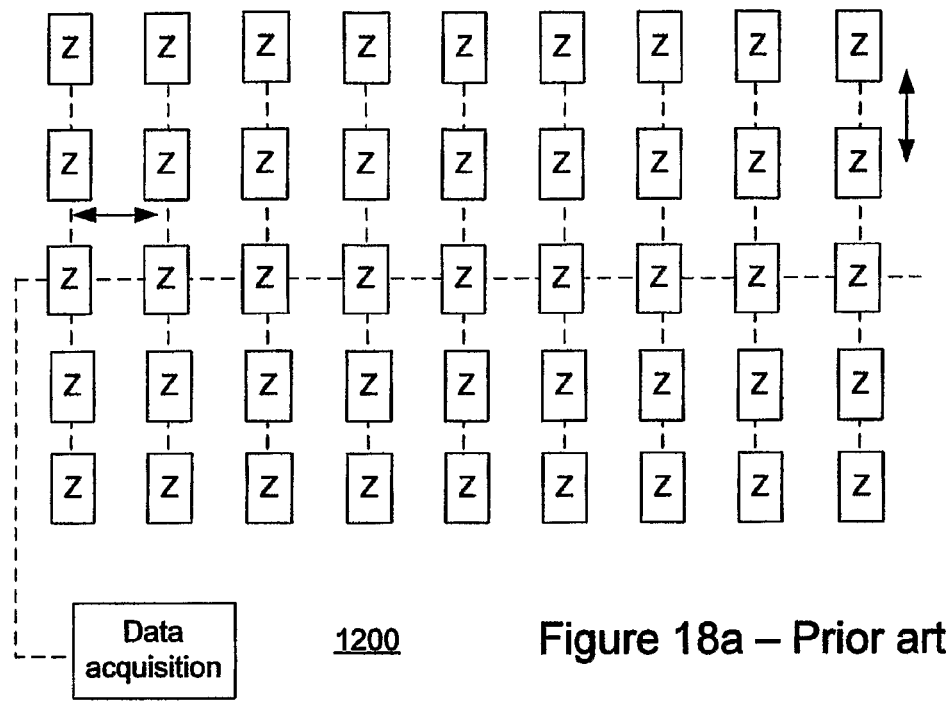
Figure 18B:
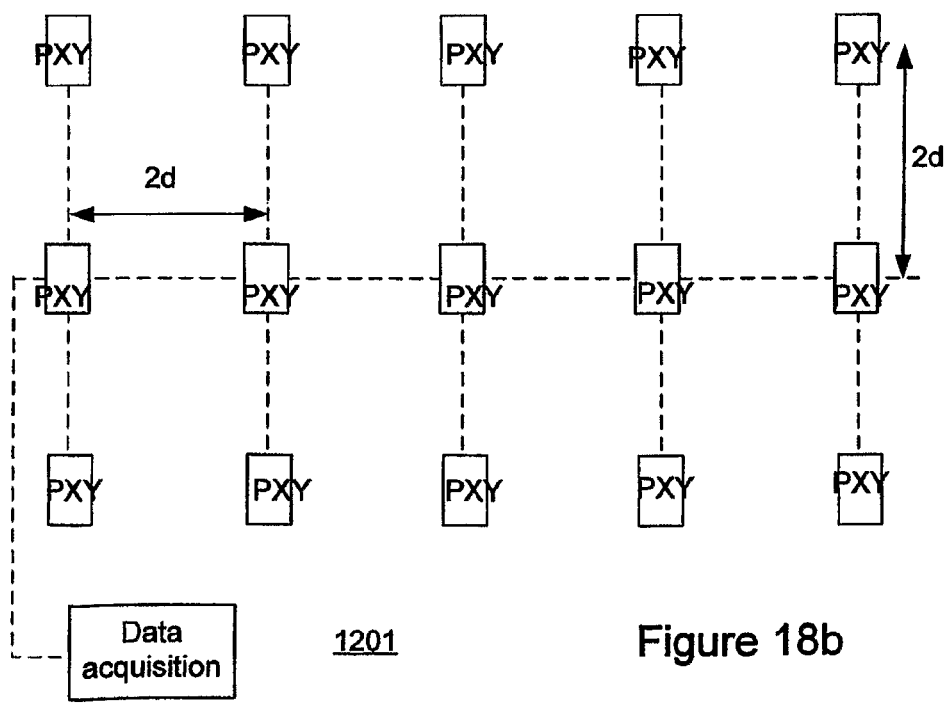

A first embodied deployment 1201 including a two dimensional array of sensor devices is shown in FIG. 18*b*. Here, plural sensor devices PXY are shown in a grid array. The sensor devices PXY are the sensor devices 500 described above with reference to FIG. 6. The sensor devices PXY have an equal spacing 2d between adjacent sensor devices PXY in both dimensions. The spacing 2d is twice the spacing between sensor devices Z of the deployment 1200. Thus, the number of sensor devices is reduced by a factor of about 4, with a corresponding reduction in base stations, power consumption etc., although the small size of the illustrative deployment shown in the Figure results in a lesser reduction.

Figure 18C:
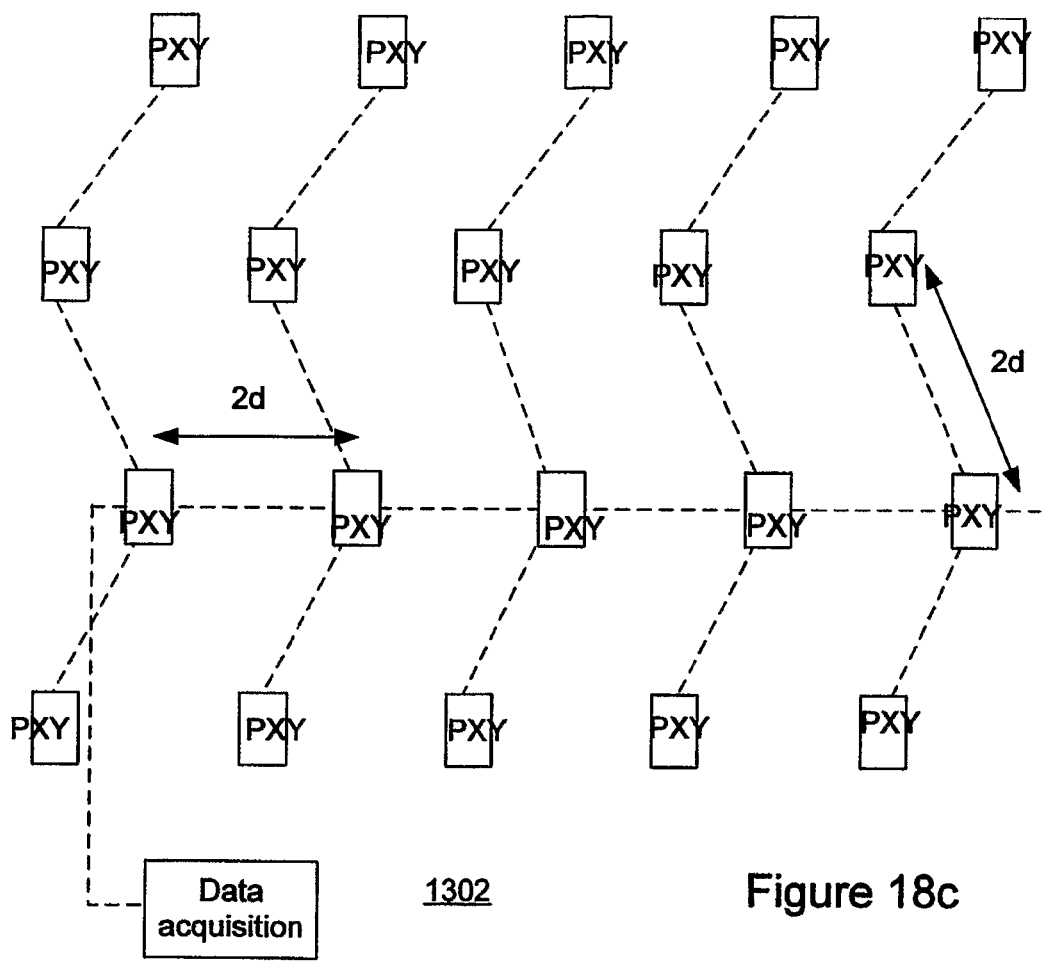

A second embodied deployment 1202 including a two dimensional array of sensor devices is shown in FIG. 18*c*. Here, plural sensor devices PXY are shown in a hexagonal array. It is called a hexagonal array because the offsetting of adjacent lines of sensor devices gives rise to each sensor device PXY being equidistant from six adjacent sensor devices PXY. The sensor devices PXY are the sensor devices 500 described above with reference to FIG. 6. The sensor devices PXY have an equal spacing 2d between each of the six adjacent sensor devices PXY. Thus, the number of sensor devices is reduced by a factor of about 4 compared to the FIG. 18*a* deployment, with a corresponding reduction in base stations, power consumption etc., although the small size of the illustrative deployment shown in the Figure results in a lesser reduction.

The deployments 1201 and 1202 are of particular use in areas where obstructions can prevent the placement of receiver devices. The benefits arise because the distance between receivers is twice that for a conventional survey so larger obstructions can be accommodated without disturbing the geometry of the sensor device placement. This applies to regular geometries and to irregular receiver geometries that may be necessary in the presence of obstructions.

Sensor devices as described above can be used in conjunction with conventional sensor devices, as will now be described with reference to FIG. 18*d*.

Figure 18D:
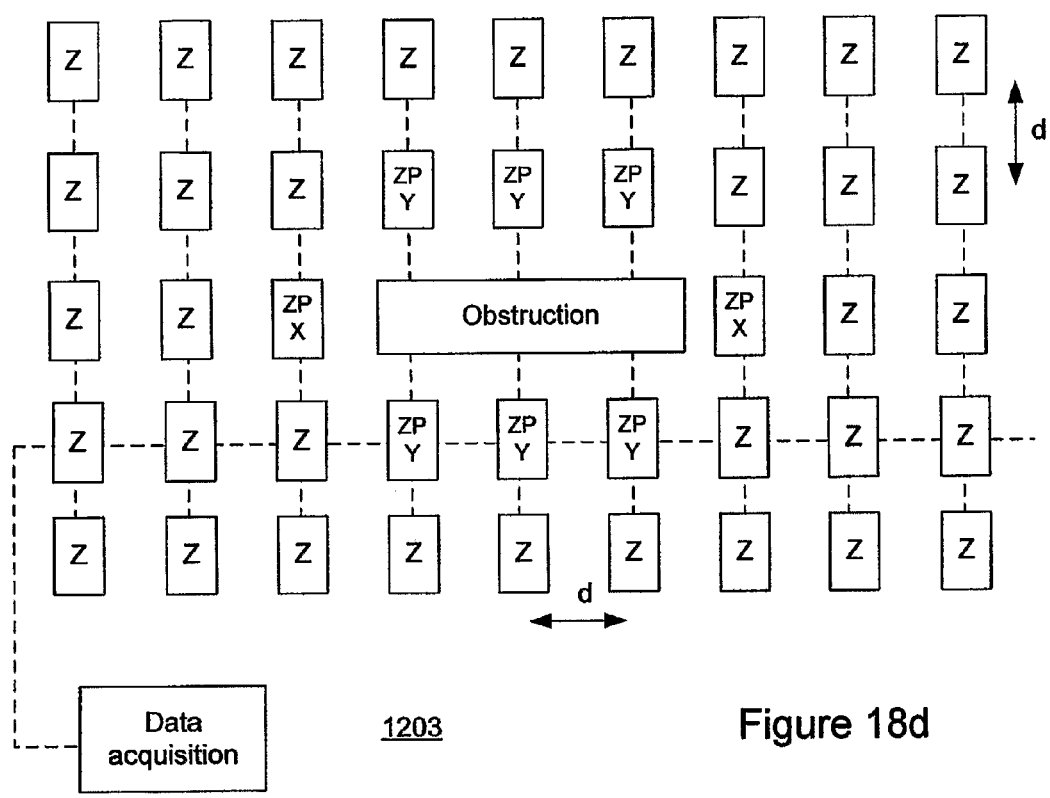

Referring to FIG. 18*d*, a third embodied deployment 1203 is based closely on the conventional deployment 1200, and incorporates a number of conventional (i.e. not involving a fluid-filled housing) z component geophone sensor devices Z. The deployment 1203 differs in that an obstruction in the centre of the deployment prevents placement of three consecutive sensor devices in the horizontal direction in the Figure. Sensor devices adjacent the obstruction are not z component geophone sensors Z but instead may be sensor devices embodied above. In particular, three sensor devices adjacent and immediately above and immediately below the obstruction are pressure, z and y component sensor devices 780 described above with reference to FIG. 11, shown at ZPY in the Figure. Also, sensor devices immediately adjacent the obstruction to the sides, as shown in the Figure, are pressure, z and x component sensor devices, indicated at ZPX in the Figure. These sensor devices ZPX are the same as the sensor devices 760 described above with reference to FIG. 10.

Different types of embodied sensor devices can be used together in a deployment, as will now be described with reference to FIG. 18*e*.

Figure 18E:
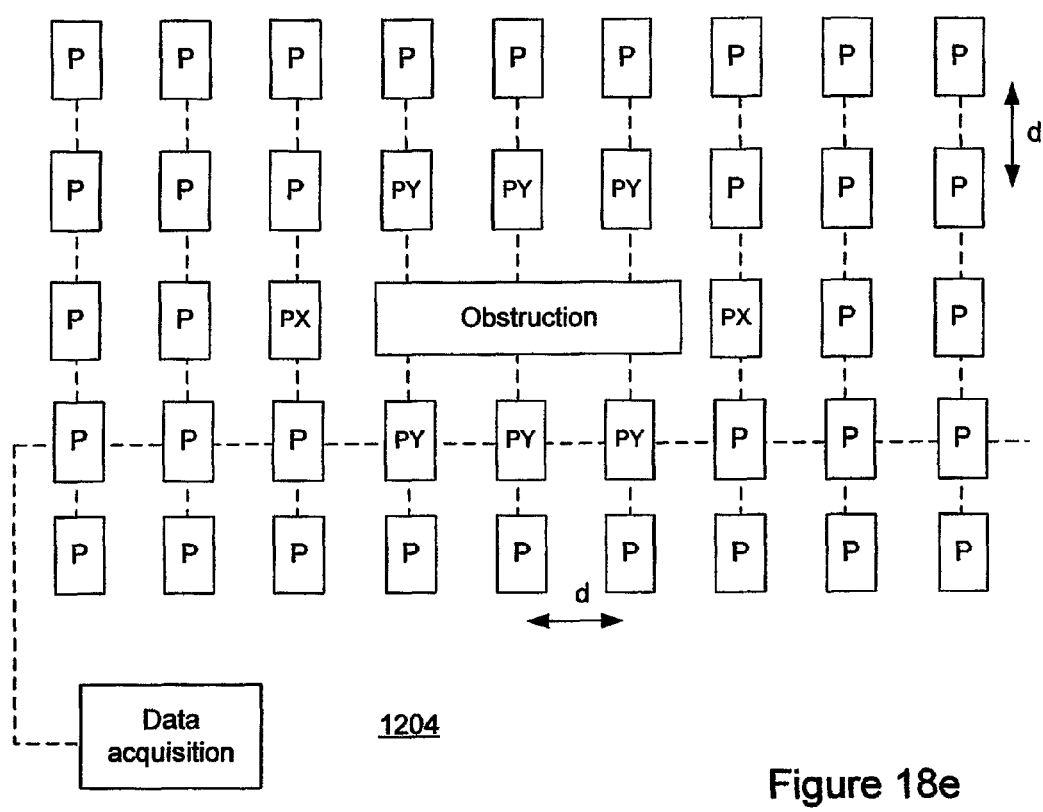

Referring to FIG. 18*e*, a fourth embodied deployment 1204 is in some ways similar to the third embodied deployment 1203. However, in place of the z component geophone sensor devices Z, sensor devices 300, as described above with reference to FIG. 4 are used and are indicated at P. The spacing of the sensor devices P is the same as that of the sensor devices Z in the deployment 1203. The centre of the deployment prevents placement of three consecutive sensor devices in the horizontal direction in the Figure. Sensor devices adjacent the obstruction are not P sensor devices 300. Instead, three sensor devices adjacent and immediately above and immediately below the obstruction are pressure and y component sensor devices 780 described above with reference to FIG. 12, shown at PY in the Figure. Also, sensor devices immediately adjacent the obstruction to the sides, as shown in the Figure are pressure and x component sensor devices, indicated at PX in the Figure. These sensor devices PX are the sensor devices 750 described above with reference to FIG. 9.

In the deployments 1203, 1204, the use of the embodied sensor devices adjacent the obstruction mitigates data lost from sensor devices which would otherwise be placed at the location of the obstruction. In particular, the hydrophone and inline sensors in the sensor devices ZPY and ZPX in the third embodied deployment 1203 are used in data processing to interpolate the wavefield near the obstruction. The inline sensors in the sensor devices PY and PX in the fourth embodied deployment 1204 are used in data processing to interpolate the wavefield near the obstruction. In both cases, the data quality resulting from surveys is better than would have occurred without the use of the different sensors. Here, the term inline refers to the orientation of the sensor devices with respect to the seismic source used in the survey—inline geophones sense velocity in a direction towards, rather than across, the direction of the source.

In the above sensor devices, it will be appreciated that accelerometers can be used instead of geophones. In the case of using accelerometers, integration in software of the sensor output typically is all that is needed in order to arrive at the velocity data provided by geophones. MEMS accelerometers are suitable for use with the above embodiments. If accelerometer information is required from geophones, this can be obtained by differentiating in software the geophone outputs.

The invention claimed is:

1. A sensor device adapted to be installed at a land-air interface, the sensor device comprising:
    a fluid-filled housing;
    a sensor arrangement supported within the fluid filled housing and coupled directly to the fluid so as to detect movement thereof, wherein the sensor arrangement comprises at least one hydrophone configured to measure pressure in the fluid filled housing and is neutrally buoyant with respect to the fluid filling the housing;
    a mechanical decoupling arrangement for mechanically decoupling one or more sensors of the sensor arrangement from the housing; and
    a coupling device located at a lower part of the housing adapted to couple the sensor device to land at the land-air interface, wherein the hydrophone is configured to measure P-waves and Rayleigh waves travelling from the land through the coupling device and the fluid filled housing.

2. A sensor device as claimed in claim 1, wherein the sensor device is adapted to be installed at a land-air interface by comprising a level oriented in common with a sensor of the sensor arrangement.

3. A sensor device as claimed in claim 1, wherein the sensor arrangement is absent of geophones and accelerometers.

4. A sensor device as claimed in claim 1, wherein the sensor arrangement comprises three hydrophones arranged generally horizontally and in different orientations to one another.

5. A sensor device as claimed in claim 1, wherein the sensor arrangement comprises the at least one hydrophone and two or more geophones or accelerometers.

6. A sensor device as claimed in claim 1, wherein the sensor arrangement comprises the at least one hydrophone and one or more geophones or accelerometers.

7. A sensor device as claimed in claim 6, wherein the sensor arrangement comprises the at least one hydrophone and two geophones or accelerometers arranged generally horizontally and in different orientations to one another.

8. A sensor device as claimed in claim 7, wherein the sensor arrangement includes a vertically aligned geophone or accelerometer and a horizontally aligned geophone or accelerometer.

9. A sensor device as claimed in claim 7, wherein the sensor arrangement includes the at least one hydrophone and two horizontally aligned geophones or accelerometers aligned orthogonally to one another.

10. A sensor device as claimed in claim 1, wherein the mechanical decoupling arrangement comprises a spring and dashpot arrangement.

11. A seismic sensor installation comprising a sensor device installed at a land-air boundary, wherein the sensor device comprises:
    a fluid-filled housing;
    a sensor arrangement comprising at least one hydrophone supported within the fluid filled housing and coupled directly to the fluid as to detect movement thereof and a pressure wavefield in the fluid filled housing, wherein the hydrophone is configured to measure P-waves and Rayleigh waves in the pressure wavefield;
    a mechanical decoupling arrangement for mechanically decoupling one or more sensors of the sensor arrangement from the housing, wherein the mechanical decoupling arrangement and the sensor arrangement are configured such that the sensor arrangement is neutrally buoyant in the fluid filled housing; and
    a coupling device located at a lower part of the housing adapted to couple the sensor device to the land.

12. An installation as claimed in claim 11, wherein the sensor device is installed on top of a land surface at the land-air boundary.

13. An installation as claimed in claim 11, wherein the sensor device is partially buried in a land surface at the land-air boundary.

14. An installation as claimed in claim 11, wherein the sensor device is provided in a borehole.

15. An installation as claimed in claim 11, comprising a level oriented in common with a sensor of the sensor arrangement.

16. An installation as claimed in claim 11, wherein the sensor arrangement comprises the at least one hydrophone and is absent of geophones and accelerometers.

17. An installation as claimed in claim 11, wherein the sensor arrangement comprises three hydrophones arranged generally horizontally and in different orientations to one another.

18. An installation as claimed in claim 11, wherein the sensor arrangement comprises the at least one hydrophone and one or more geophones or accelerometers.

19. An installation as claimed in claim 11, wherein the sensor arrangement is absent of the at least one hydrophone and comprises two or more geophones or accelerometers.

20. An installation as claimed in claim 18, wherein the sensor arrangement comprises the at least one hydrophone and two geophones or accelerometers arranged generally horizontally and in different orientations to one another.

21. An installation as claimed in claim 20, wherein the sensor arrangement includes the at least one hydrophone and a vertically aligned geophone or accelerometer and a horizontally aligned geophone or accelerometer.

22. An installation as claimed in claim 20, wherein the sensor arrangement includes the at least one hydrophone and two horizontally aligned geophones or accelerometers aligned orthogonally to one another.

23. An installation as claimed in claim 11, wherein the mechanical decoupling arrangement comprises a spring and dashpot arrangement.

24. An installation as claimed in claim 11, comprising a two dimensional array of sensor devices installed at the land-air boundary.

25. A method for sensing compressional waves at a land-air boundary, comprising:
    positioning a fluid-based sensor system proximal to the land-air boundary, wherein the fluid-based sensor system is coupled with the land at the land-air boundary and comprises a housing, a fluid disposed within and filling the housing and one or more sensors coupled directly to the fluid, and wherein:
- the one or more sensors are configured to measure P-waves and Rayleigh waves traveling through the fluid filled housing;
- the one or more sensors are disposed within the fluid filled housing;
- the one or more sensors are neutrally buoyant in the fluid filled housing; and
- the one or more sensors are mechanically decoupled from the housing; and using the one or more sensor to detect movement of the fluid.

26. The method of claim 25, wherein the Rayleigh waves and P-waves comprise compressional waves that produce pressure changes in the fluid filled housing.

\* \* \* \* \*